(12) United States Patent
Zhu et al.

(10) Patent No.: US 7,969,540 B2
(45) Date of Patent: Jun. 28, 2011

(54) TRANSFLECTIVE LIQUID CRYSTAL DISPLAY HAVING MUTUALLY COMPLEMENTARY PATTERNED ELECTRODE AND REFLECTOR

(75) Inventors: Xinyu Zhu, Orlando, FL (US); Zhibing Ge, Orlando, FL (US); Shin-Tson Wu, Oviedo, FL (US)

(73) Assignees: University of Central Florida Research Foundation, Inc., Orlando, FL (US); Toppoly Optoelectronics Corp., Miao-Li County (TW)

( * ) Notice: Subject to any disclaimer, the term of this patent is extended or adjusted under 35 U.S.C. 154(b) by 90 days.

(21) Appl. No.: 11/975,230

(22) Filed: Oct. 18, 2007

(65) Prior Publication Data

US 2008/0043188 A1    Feb. 21, 2008

Related U.S. Application Data

(62) Division of application No. 11/110,229, filed on Apr. 20, 2005, now Pat. No. 7,339,641.

(51) Int. Cl.
*G02F 1/1335* (2006.01)
(52) U.S. Cl. ......... 349/114; 349/113; 349/117; 349/119
(58) Field of Classification Search .................. 349/114, 349/113, 117, 119
See application file for complete search history.

(56) References Cited

U.S. PATENT DOCUMENTS

| | | | |
|---|---|---|---|
| 4,315,258 A | 2/1982 | McKnight et al. | |
| 5,933,207 A | 8/1999 | Wu | |
| 6,208,405 B1 | 3/2001 | Sakong et al. | |
| 6,281,952 B1 | 8/2001 | Okamoto et al. | |
| 2002/0180911 A1 | 12/2002 | Iijima | |
| 2003/0202139 A1 | 10/2003 | Choi et al. | |
| 2004/0145689 A1* | 7/2004 | Sugiura et al. | 349/113 |
| 2004/0155999 A1 | 8/2004 | Okumura et al. | |
| 2004/0189903 A1 | 9/2004 | Yoshii et al. | |
| 2005/0140876 A1* | 6/2005 | Kubo | 349/114 |
| 2005/0231666 A1 | 10/2005 | Kim et al. | |
| 2005/0248693 A1 | 11/2005 | Kurasawa | |
| 2006/0098144 A1* | 5/2006 | Chang et al. | 349/114 |

\* cited by examiner

*Primary Examiner* — David Nelms
*Assistant Examiner* — Lauren Nguyen
(74) *Attorney, Agent, or Firm* — Brian S. Steinberger; Phyllis K. Wood; Law Offices of Brian S. Steinberger, P.A.

(57) ABSTRACT

A transflective liquid crystal display with uniform cell gap configuration throughout the transmissive and the reflective display region is invented. Mutually complementary common electrode pattern and reflector pattern or mutually complementary ITO pixel electrode pattern and reflector pattern produce an electric field in the transmissive display region that has a uniform longitudinal field and an electric field in the reflective display region that is a fringing field. An initially vertically aligned negative dielectric anisotropic nematic liquid crystal material between the electrodes forms a smaller tilt angle with respect to the substrate normal in the reflective display region while a larger tilt angle with respect to the substrate normal in the transmissive display region. Consequently, the ambient incident light experiences smaller phase retardation in the reflective display region while the light from the backlight source experiences larger phase retardation. Since the ambient light passes through the reflective display region twice while the light from the backlight source passes through the transmissive display region only once, by properly designing the electrodes and the reflector width, the light from both ambient light source and backlight source will experience almost the same phase retardation in both reflective and transmissive display regions. As a result, the electro-optical performance curves of both-transmissive display mode and reflective display mode overlap.

5 Claims, 29 Drawing Sheets

US 7,969,540 B2

TRANSFLECTIVE LIQUID CRYSTAL DISPLAY HAVING MUTUALLY COMPLEMENTARY PATTERNED ELECTRODE AND REFLECTOR

This is a Divisional of application Ser. No. 11/110,229 filed Apr. 20, 2005 now U.S. Pat. No. 7,339,641.

FIELD OF THE INVENTION

This invention relates to transflective liquid crystal displays and, in particular, to designing the common electrode and the pixel electrode to generate a longitudinal electric field in the transmissive display region and to generate a fringing field in the reflective display region. Therefore, the initially vertically aligned negative dielectric anisotropic nematic liquid crystal molecules will form a smaller tilt angle with respect to the substrate normal in the reflective display region and form a larger tilt angle with respect to the substrate normal in the transmissive display region. Consequently, the ambient incident light experiences smaller phase retardation in the reflective display region while the light from the backlight source experiences larger phase retardation. Since the ambient light passes through the reflective display region twice while the light from the backlight source passes through the transmissive display region only once, by properly designing the electrodes and the reflector width, the light from both ambient light source and backlight source will experience almost the same phase retardation in both reflective and transmissive display regions. As a result, the electro-optical performance curves of both transmissive display mode and reflective display mode overlap very well.

BACKGROUND AND PRIOR ART

Transmissive liquid crystal display (LCD) is widely used as information display tools, such as cell phone, personal digital assistant, laptop computer and so on. The most commonly used transmissive twisted-nematic (TN) LCD has a 90° TN liquid crystal layer sandwiched between two perpendicularly rubbed transparent substrates with Indium-Tin-Oxide (ITO), coatings. Two linear polarizers are placed at the outside of transparent substrates to act as a polarizer and an analyzer whose transmission directions are either parallel or perpendicular to the rubbing direction of the adjacent substrate. In addition, a backlight is put outside of the polarizer as the light source. Without voltage, the incident light becomes linearly polarized after passing through the polarizer, then follows the twist structure of TN liquid crystal layer, and finally transmits through the analyzer, resulting in a bright state. When the applied voltage exceeds the threshold voltage, the twist structure of TN liquid crystal layer is broken and the incident linear polarizer can not follow the liquid crystal twist structure; consequently, the light, in general, becomes elliptically polarized and the output transmittance decreases. If the applied voltage is high enough, the volume part of the liquid crystal molecules are approximately aligned perpendicularly to the substrates, except the crossed residual boundary liquid crystal layers. In this case, the incident linearly polarized light nearly maintains the same polarization state after passing through the entire liquid crystal layer, and then is blocked by the analyzer, resulting in a very good dark state. A major drawback of the transmissive LCD is that its backlight source should be on all the time when the display is in use; therefore, the power consumption is relatively high. Another disadvantage is that the image of transmissive LCD is easily washed out under strong ambient light conditions, such as outdoor sunlight.

Reflective LCD, on the other hand, has no built-in backlight source. Instead, it utilizes ambient light for reading the displayed images. U.S. Pat. No. 5,933,207 issued to Wu on Aug. 3, 1999 describes a reflective LCD comprising a polarizer, a phase compensation film, a liquid crystal layer, and a reflector. Compared to the transmissive LCD, the reflective LCD has advantages including low power consumption, light weight, and good outdoor readability. However, a reflective LCD relies on ambient light and thus is inapplicable under low light levels or dark ambient conditions.

To utilize the advantages, and overcome the disadvantages, of both transmissive LCD and reflective LCD, the transflective LCD is used in the apparatus, method, system, and device of the present invention. Transflective LCD means the apparatus displays an image in transmissive display mode and reflective display mode either independently or simultaneously. Therefore, such a transflective LCD is designed to be used under any ambient circumstances; U.S. Pat. No. 4,315,258 issued to McKnight et al on Feb. 9, 1982 proposed a transflective LCD design shown as 10 in FIG. 1. It consists of a front polarizer 11, a LC panel 12, a rear polarizer 13, a transflector (partially transmitting mirror) 14 and a backlight source 15. Such a structure is actually modified from the conventional transmissive twisted-nematic (TN) LCD by putting a transflector 14 between the rear polarizer 13 and backlight source 15. This prior art has the advantages of a simple manufacturing process and low cost; however, it suffers from serious parallax problem because the ambient light passes through a very thick glass substrate before it hits the transflector. When the display device is viewed from an oblique direction, the reflected beam and input beam pass through different pixel areas, resulting in a shadowed image, which is called parallax. Such a parallax problem becomes increasingly serious when the pixel size decreases in high resolution display devices.

To overcome the parallax problem, the transflector should be imbedded in the inner side of the bottom substrate. U.S. Pat. No. 6,281,952 to Okamoto et al proposed a transflective LCD design shown as 200 in FIG. 2. It consists of a top linear polarizer 201a and a bottom linear polarizer 201b, a top compensation film 202a and a bottom compensation film 202b, a top transparent substrate 203a and a bottom transparent substrate 203b, a liquid crystal layer 208 sandwiched between the top substrate 203a and the bottom substrate 203b. The top substrate 203a is coated with a transparent electrode 204a and a first alignment film 205a. The bottom substrate 203b is coated with a transflector means 212, which contains a non-uniform thickness isolation layer 206, a transparent electrode 204b and a patterned reflection layer 207. The reflection layer 207 only covers the thick isolation layer region, which defines the reflective display region 210. The thin isolation layer region, which defines the transmissive region 211, is not covered with the reflection layer 207. Above the transflector means 212 is a second alignment film 205b. The liquid crystal layer 208 contacts with both the first alignment film 205a and the second alignment film 205b. A backlight source 209 is provided outside of the bottom polarizer 201b to function as the light source for the transmissive display region 211. Since the transflector means 212 was deposited inside of the bottom substrate 203b, the reflected beam does not pass through the very thick bottom substrate 203b; therefore, the parallax problem is eliminated. In addition, in order to compensate the optical path difference between the reflective and transmissive display modes, the cell gap in transmissive display region 211 is thicker than that in reflective display region 210 or the director alignment mechanism in transmissive display region 211 is different from that in reflective display region 210. Nevertheless, in either case, the manufacturing process is quite complicated and hence the manufacturing cost is relatively high. Another drawback of the different cell gap approach is that the response time in reflective region 210 is different from that in transmissive region 211 since the response time is proportional to the square of cell gap. Furthermore, the different cell gap or different alignment for transmissive and reflective display regions will introduce a disclination line on the border of two regions, which leads to dark state light leakage and thus degraded contrast ratio of the displayed image.

To solve the cell gap difference problem while keeping parallax-free in transflective CD, US patent application No. 20030202139 by Choi et al disclosed a transflective LCD design with partial switching method shown as 300 in FIG. 3. It consists of a top substrate 301a coated with a top transparent electrode 302 and an alignment film 303a, a bottom substrate 301b coated with a transflector means 304 and an alignment film 303b, and an liquid crystal layer 305 sandwiched between the top substrate 301a and bottom substrate 301b. The transflector means 304 is composed of a non-patterned (continuous) transparent electrode 304a, a patterned (discontinuous) transparent electrode 304b, a reflector 304c below the patterned transparent electrode 304b, and an insulating layer 304d. The non-patterned transparent electrode 304a area defines the transmissive display region 306, while the reflector 304c area defines the reflective display region 307. The non-patterned transparent electrode 304a and the patterned transparent electrode 304b are connected with each other and they have the same electric potential. The electric field between top transparent electrode 302 and bottom non-patterned transparent electrode 304a is strong and almost perpendicular to the substrates 301a and 301b. Such a strong electric field drives the liquid crystal molecules 305a to almost fully tilted as shown in FIG. 3. While the electric field between top transparent electrode 302 and bottom patterned transparent electrode 304b is a fringing field and its overall strength is weaker than the field above the non-patterned transparent electrode 304a. Such a weak fringing field only drives the liquid crystal molecules 305b partially tilted.

Therefore, the phase retardation in reflective region is approximately half of that in transmissive region. However, since the reflector 304c should be located under the discontinuous electrode 304b, the insulating layer 304d is inevitable, which increase the manufacturing process. To avoid use of an insulating layer 304d, the discontinuous electrode 304b can be coated on the top substrate 301a. In either case, however, the weak electrical field only exists between the discontinuous electrode gap and the common electrode 302, while the electrical field right above the discontinuous electrode 304b is still as strong as that in transmissive region 306. In other words, not the whole reflective display region is governed by fringing field. Consequently, the local region liquid crystal molecules above the discontinuous electrode 304b are still full-tilted as in transmissive region 306. Therefore, the gray scale of reflective and transmissive display modes still does not overlap very well, as shown in FIG. 6 of US patent application 20030202139.

SUMMARY OF THE INVENTION

A first objective of this invention is to provide a new transflective LCD with uniform cell gap throughout the transmissive region and reflective region to simplify the manufacturing process and lower the manufacturing cost.

A second objective of the invention is to provide a new transflective LCD with mutually complementary patterned reflector and patterned common electrode such that the transmissive display region is governed by a longitudinal electric field, while the reflective display region is governed by a fringing field. Therefore, the grayscales of both the reflective mode and the transmissive mode effectively overlap when the pattern size and pattern gap are properly designed.

A third objective of the invention is to provide a new transflective LCD with uniform alignment treatment in both transmissive and reflective regions using mutually complementary reflector pattern and the common electrode pattern, which make the electric field in the reflective display region weaker than that in the transmissive display region to eliminate the disclination line that occurs in the dual cell gap method of the prior art.

A fourth objective of the invention is to provide a new transflective LCD with high contrast ratio and high brightness A fifth objective of the invention is to provide a new method of constructing approximately mutually complementary reflector pattern on the bottom substrate and common electrode pattern on the top substrate in the transflective LCD to ensure that the reflective display region is governed by a fringing field while the transmissive display region is governed by a longitudinal electric field.

In the reflective display mode, the ambient light travels through the reflective region twice, while in the transmissive display mode, the backlight passed through transmissive region only once. Thus, there is approximately twice the difference in the overall optical path between the transmissive and reflective regions. To make a transflective LCD with uniform cell gap throughout both reflective and transmissive regions, the phase retardation in reflective region should be half that of transmissive region at any applied voltage state so that the gray scales of both the reflective mode and transmissive mode can overlap effectively.

In the apparatus, method, system and device of the present invention, a transflective LCD with a mutually complementary common electrode pattern and reflector pattern is disclosed. The transflector is deposited on the bottom substrate and is composed of a non-patterned transparent electrode coated with patterned reflector. As a result, the area without patterned reflector coverage is transparent, while the area with patterned reflector coverage is opaque and reflects incident light. The opaque area defines the reflective display region, while the transparent area defines the transmissive display region. The non-patterned transparent electrode can be made of Indium-Tin-Oxide (ITO) and the patterned reflector is directly deposited above the non-patterned transparent electrode. The patterned reflector can be made of high reflectivity conductive metal materials, such as aluminum, aluminum alloy, silver, and so on. In addition, the patterned reflector can also be fabricated from some nonconductive materials, such as high reflectivity multilayer dielectric thin films. Since the patterned reflector and the non-patterned transparent electrode are connected together, no additional insulating layer is necessary between them. If the patterned reflector is made of conductive metallic materials, then both the non-patterned transparent electrode and the patterned reflector function as the pixel electrode. On the other hand, if the patterned reflector is made of nonconductive materials, then only the non-patterned transparent electrode functions as the pixel electrode.

The top substrate side is coated with a patterned transparent common electrode. The common electrode pattern is approximately mutually complementary with the reflector pattern on the bottom substrate. As a result, there is no common electrode above the reflector coverage, while there is common electrode above the transparent pixel electrode area without the reflector coverage. Such a mutually complementary reflector pattern and common electrode pattern configuration ensures that the transmissive display region is governed by a longitudinal electric field, while the reflective display region is governed by a fringing field. Therefore, the electric field in the reflective display region is weaker than that in the transmissive display region. By properly designing the pattern size and pattern gap, the single pass phase retardation in the reflective display region can be approximately half the single pass phase retardation in the transmissive display region at any applied voltage state. Because the ambient incident light passes through the reflective display region twice while backlight incident light passes through the transmissive display region only once, the grayscales of the reflective display mode effectively overlap those of the transmissive display mode.

Further objects and advantages of this invention will be apparent from the following detailed description of preferred embodiments which are illustrated schematically in the accompanying drawings.

DESCRIPTION OF THE PREFERRED EMBODIMENTS

Figure 1:
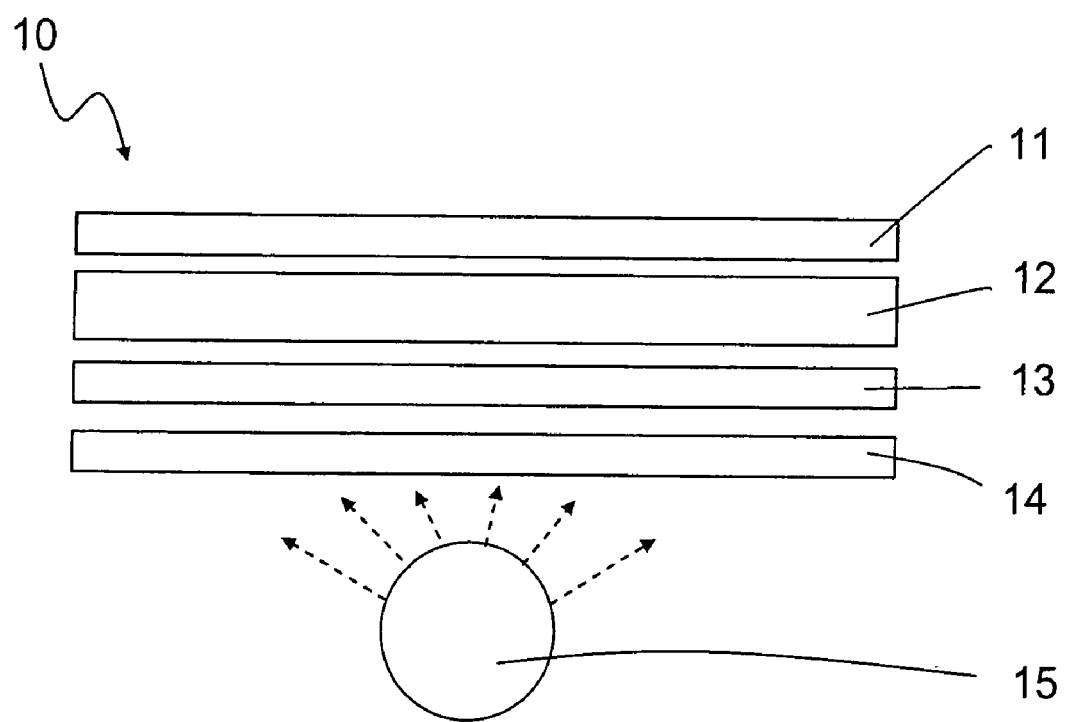
FIG. 1 is a schematic structure of a prior art transflective LCD.
Figure 2:
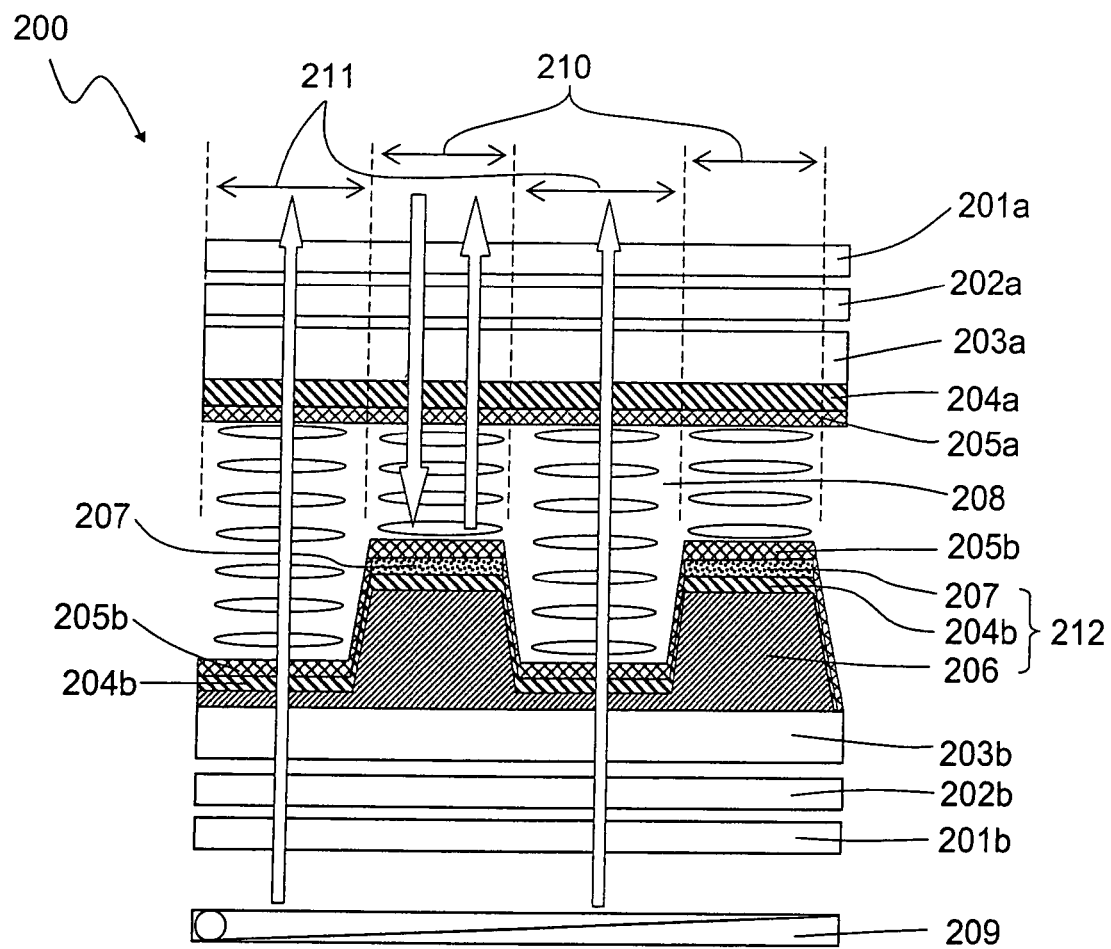
FIG. 2 is a schematic structure of another prior art transflective LCD.
Figure 3:
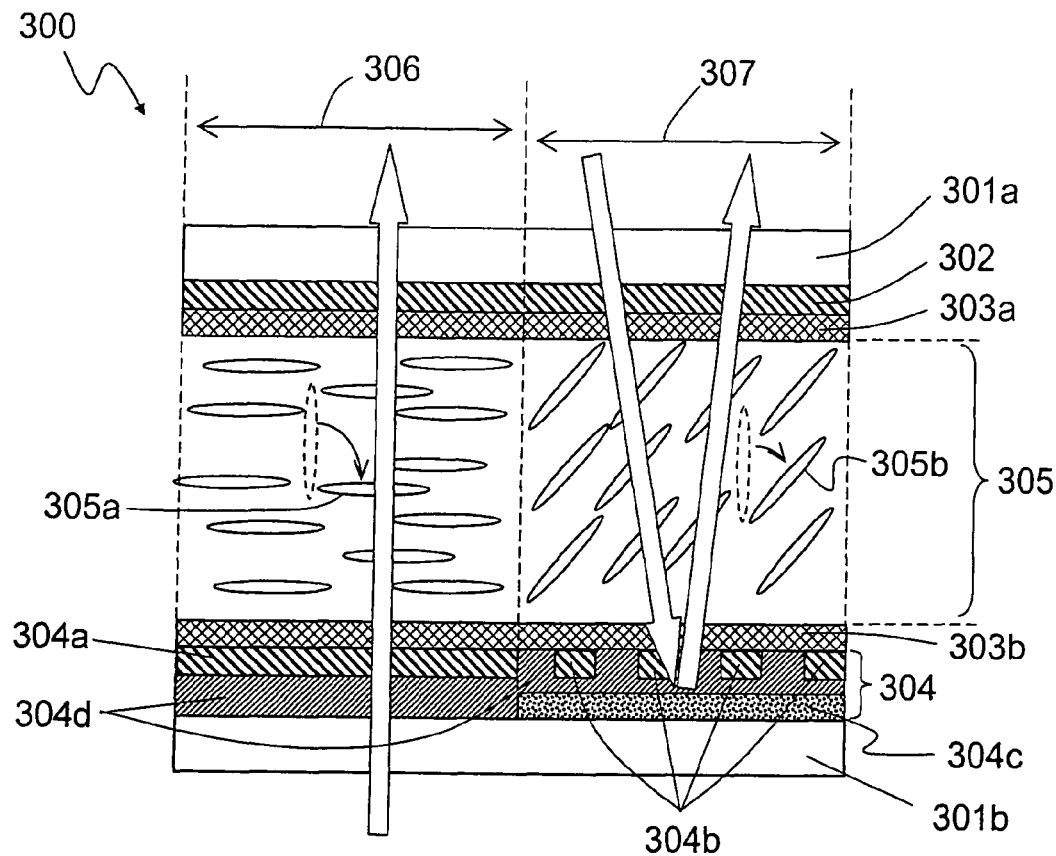
FIG. 3 is a schematic structure of yet another prior art transflective LCD.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 10 | transflective LCD design (U.S. Pat. No. 4,315,258) |
| 11 | front polarizer |
| 12 | LC panel |
| 13 | rear polarizer |
| 14 | transflector |
| 15 | backlight source |
| 200 | transflective LCD design (U.S. Pat. No. 6,281,952) |
| 201a | top linear polarizer |
| 201b | bottom linear polarizer |
| 202a | top compensation film |
| 202b | bottom compensation film |
| 203a | top transparent substrate |
| 203b | bottom transparent substrate |
| 204a | transparent electrode |
| 204b | transparent electrode |
| 205a | first alignment film |
| 205b | second alignment film |
| 206 | isolation layer |
| 207 | reflection layer |
| 208 | liquid crystal layer |
| 209 | backlight source |
| 210 | reflective display region |
| 211 | transmissive display region |
| 212 | transflector means |
| 300 | transflective LCD w/partial switching (U.S. patent application No. 20030202139) |
| 301a | top substrate |
| 301b | bottom substrate |
| 302 | transparent electrode |
| 303a | alignment film |
| 303b | alignment film |
| 304 | transflector means |
| 304a | non-patterned transparent electrode |
| 304b | patterned transparent electrode |
| 304c | reflector |
| 304d | insulating layer |
| 305 | liquid crystal layer |
| 305a | liquid crystal molecules |
| 305b | liquid crystal molecules |
| 306 | transmissive region |
| 307 | reflective region |
| 400 | transflective LCD, the first embodiment of the present invention |
| 401a | first polarizer |
| 401b | second polarizer |
| 402a | first half-wave retardation film |
| 402b | second half-wave retardation film |
| 403a | first quarter-wave retardation film |
| 403b | second quarter-wave retardation film |
| 404 | negative birefringence c-film |
| 405a | first transparent substrate |
| 405b | second transparent substrate |
| 406a | patterned ITO layer |
| 406b | non-patterned ITO layer |
| 407 | patterned reflector |
| 408a | first non-conductive planar layer |
| 408b | second non-conductive planar layer |
| 409a | first vertical alignment film |
| 409b | second vertical alignment film |
| 410 | vertically aligned negative dielectric anisotropic nematic LC layer |
| 411 | backlight source |
| 412 | transmissive display region |
| 413 | reflective display region |
| 701 | empty area |
| 900 | transmissive LCD, the second embodiment of the present invention |
| 901a | first polarizer |
| 901b | second polarizer |
| 902a | first half-wave retardation film |
| 902b | second half-wave retardation film |
| 903a | first quarter-wave retardation film |
| 903b | second quarter-wave retardation film |
| 904 | negative birefringence c-film |
| 905a | first transparent substrate |
| 905b | second transparent substrate |
| 906a | non-patterned ITO layer |
| 906b | patterned ITO layer |
| 907 | patterned reflector |
| 908 | non-conductive planar layer |
| 909a | first vertical alignment film |
| 909b | second vertical alignment film |
| 910 | vertically aligned negative dielectric anisotropic nematic liquid crystal layer |
| 911 | backlight source |
| 912 | transmissive display region |
| 913 | reflective display region |

The apparatus, method, system and device of the present invention discloses a common electrode and pixel electrode design for producing a transflective LCD having a uniform cell gap configuration. In the transflective LCD, the light from the backlight source passes through the liquid crystal layer once in transmissive display region while the ambient light passes through the liquid crystal layer twice in reflective display region. Both the backlight source input light and the ambient incident light must experience almost the same phase retardation after passing through liquid crystal layer to achieve overlapping grayscales of both reflective display mode and transmissive display mode. To achieve the overlap, the transflective LCD is designed with (1) a mutually complementary common electrode pattern and reflector pattern or (2) a mutually complementary transparent pixel electrode pattern and opaque reflector pattern such that the electric field in the transmissive region is basically longitudinal and substantially perpendicular to both top and bottom substrates, while the electric field in reflective display region is a fringing field, whose longitudinal component is approximately half the strength of that in the transmissive display region.

Embodiment 1

Figure 4:
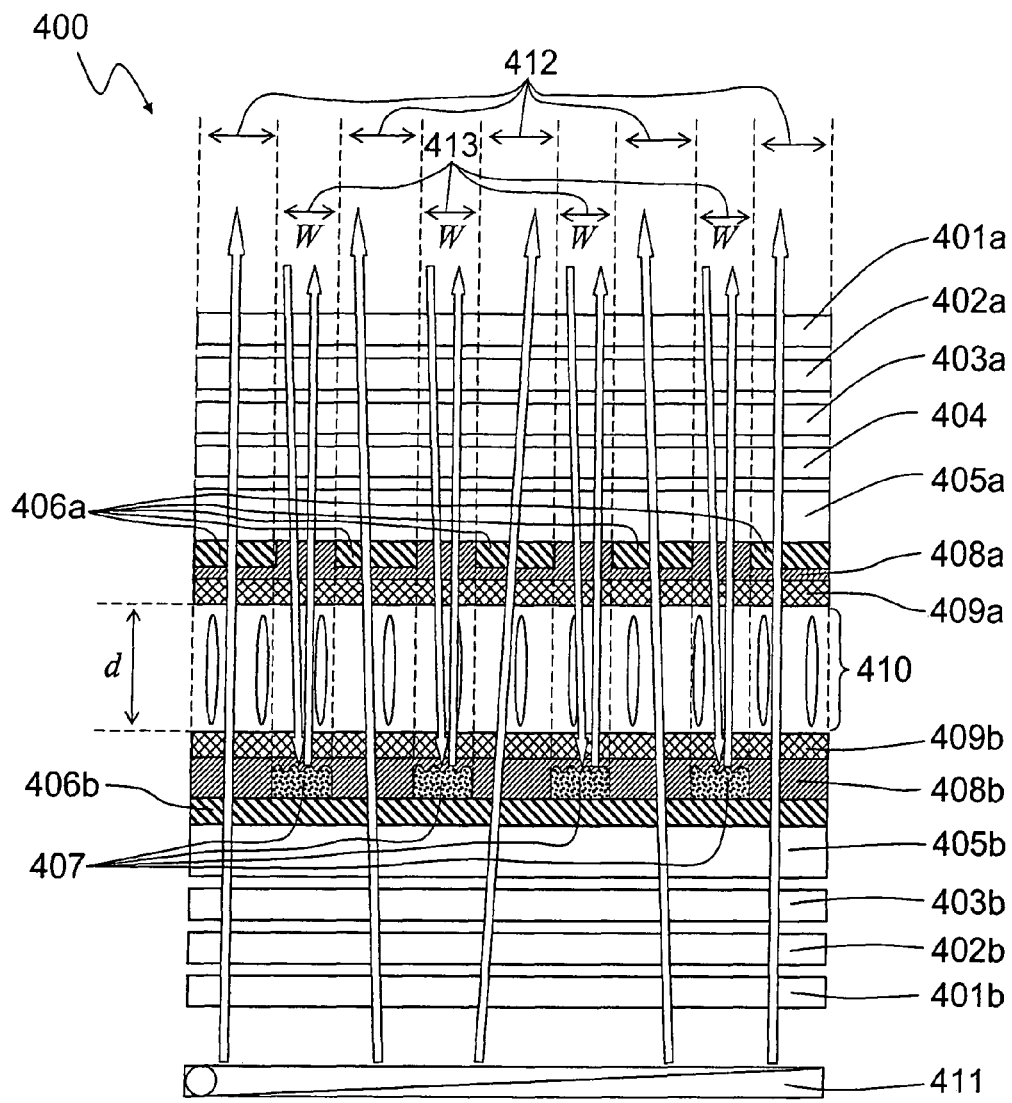
FIG. 4 is a schematic structure of the transflective LCD in this invention according to the first embodiment.

FIG. 4 shows the structure of a first embodiment of the transflective LCD 400 with uniform cell gap configuration of the present invention which consists of a first transparent substrate 405a coated with a patterned ITO layer 406a, a first non-conductive planar layer 408a, and a first vertical alignment film 409a; a second transparent substrate 405b coated with a non-patterned ITO layer 406b, a patterned reflector 407, a second non-conductive planar layer 408b, and a second vertical alignment film 409b; and a vertically aligned negative dielectric anisotropic nematic liquid crystal layer 410 with thickness d sandwiched between the first vertical alignment film 409a and the second vertical alignment film 409b.

A negative birefringence c-film 404, a first quarter-wave retardation film 403a, a first half-wave retardation film 402a, and a first polarizer 401a are further laminated on the outer surface of the first substrate 405a, wherein the negative birefringence c-film 404 contacts with the first substrate 405a and the first polarizer 401a faces the observer. A second quarter-wave retardation film 403b, a second half-wave retardation film 402b, and a second polarizer 401b are laminated on the outer surface of the second substrate 405b. In addition, a backlight source 411 is further provided outside of the second polarizer 401b. In this configuration, the patterned reflector 407 can be made of high reflectivity conductive metal materials, such as aluminum, aluminum alloy, silver and so on. In addition, the patterned reflector 407 can be made of some nonconductive materials, such as high reflectivity multilayer dielectric thin films. In either case, an additional insulating layer is not required between the patterned reflector 407 and the non-patterned transparent electrode 406b. If the patterned reflector 407 is made of conductive metal materials, then both non-patterned transparent electrode 406b and patterned reflector 407 function as the pixel electrode and have the same electric potential. On the other hand, if the patterned reflector 407 is made of nonconductive materials, then only the non-patterned transparent electrode 406b functions as the pixel electrode.

The hollow arrows in FIG. 4 represent the propagation directions of both ambient light and backlight source. The non-patterned ITO layer 406b is further connected with the drain electrode of the thin-film transistor (TFT), which is not shown. For purpose of illustration, FIG. 4 only shows the basic structure of one pixel area of the whole transflective LCD. Other elements, such as the TFT, color filter, storage capacitor, data line, and gate line, although necessary to drive the display device, are not shown. The area of the non-patterned ITO layer 406b with patterned reflector 407 coverage is defined as the reflective display region 413, while the area of the non-patterned ITO layer 406b without patterned reflector 407 coverage is defined as the transmissive display region 412. More importantly, the patterned ITO layer 406a, which serves as the common electrode, is approximately mutually complementary with the patterned reflector 407. This means that the top patterned ITO layer 406a only covers the transmissive display region 412 and does not cover the reflective display region 413. Therefore, the electric field in the transmissive display region 412 is different from that in the reflective display region 413.

Figure 5:
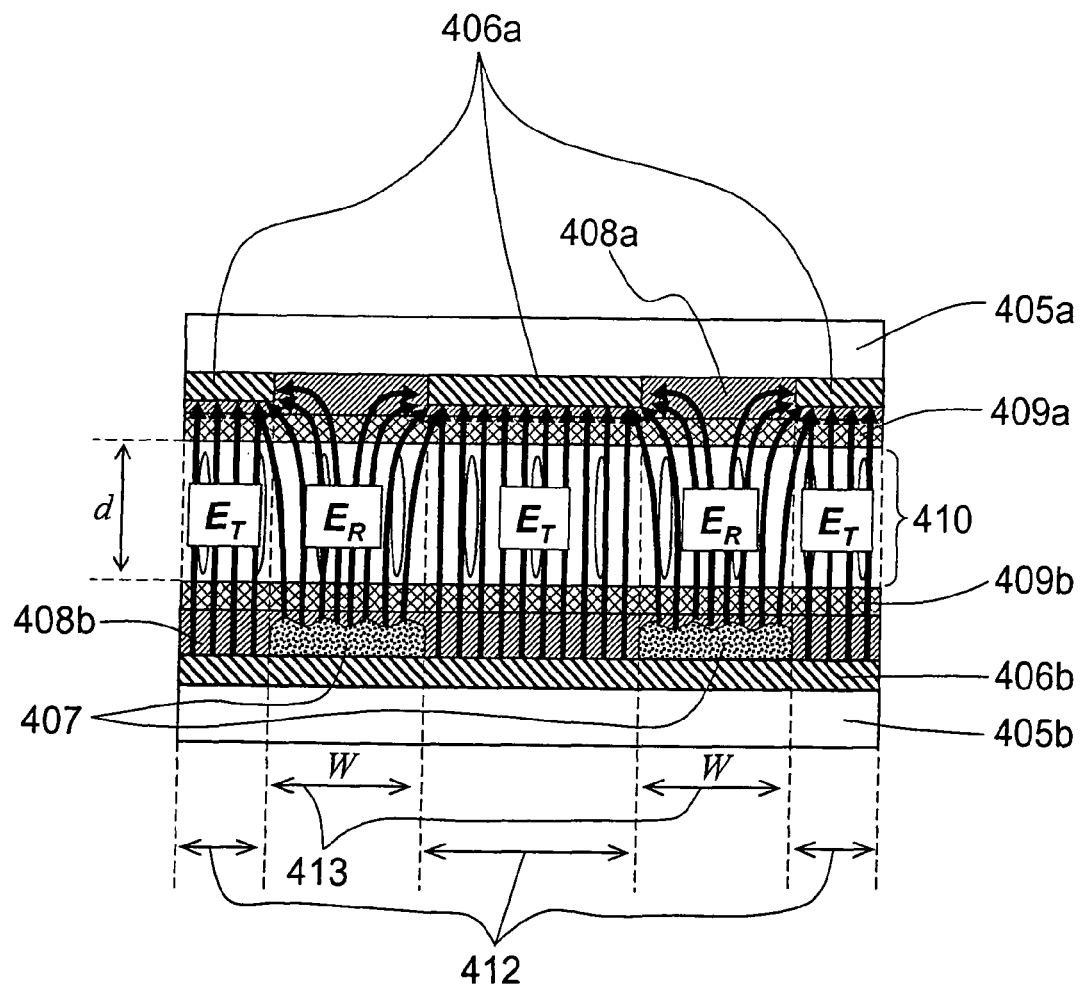
FIG. 5 illustrates the electric field distribution in both the transmissive display region and reflective display region according to the first embodiment.
Figure 6:
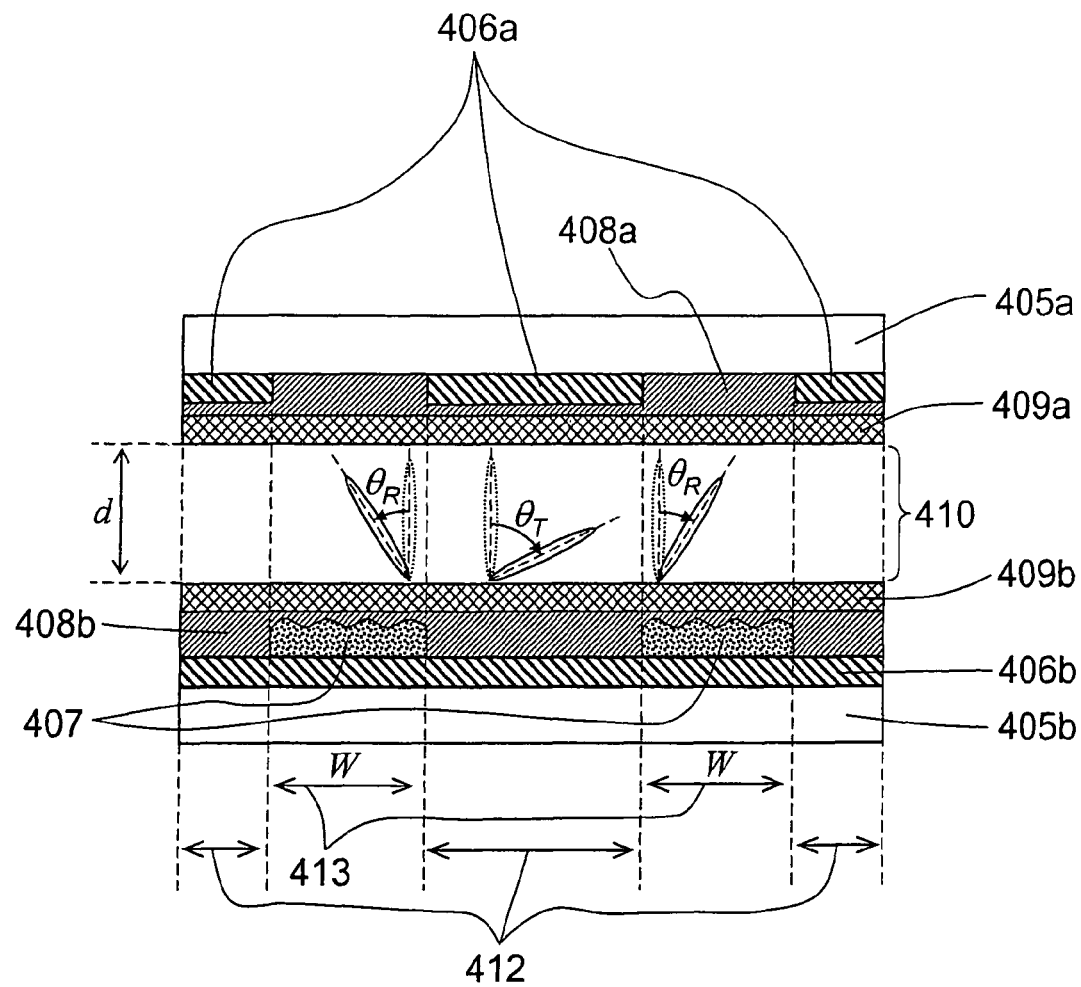
FIG. 6 illustrates the director distribution in both transmissive display region and reflective display region under the electric field distribution shown in FIG. 5.

FIG. 5 shows the electric field distribution in the transmissive display region 412 and the reflective display region 413 of one pixel area. Since the top patterned ITO layer 406a only approximately covers the transmissive display region 412 and does not cover the reflective display region 413, the electric field in the transmissive display region 412 is a uniform longitudinal field $E_T$, which is perpendicular to the first substrate 405a and the second substrate 405b. On the other hand, the electric field in the reflective region 413 is a fringing field $E_R$, which has both longitudinal and horizontal components. Consequently, the longitudinal component of $E_T$ in the transmissive display region 412 is stronger than that of fringing field $E_R$ in the reflective display region 413. FIG. 6 shows the liquid crystal director distribution in both the transmissive and reflective display regions according to the electric field distribution as shown in FIG. 5. Under each applied voltage state, the liquid crystal director in the transmissive display region 412 is tilted at an angle $\theta_T$ with respect to the substrate normal direction, and the liquid crystal director in the reflective display region 413 is tilted at an angle $\theta_R$ with respect to the substrate normal direction. Since the longitudinal component of $E_T$ in the transmissive display region 412 is stronger than that of $E_R$ in the reflective display region 413 and the initially vertically aligned negative dielectric anisotropic nematic liquid crystal molecules only respond to the longitudinal component of the electric field, the tilt angle $\theta_R$ in the reflective display region 413 is smaller than the tilt angle $\theta_T$ in the transmissive display region 412. As a result, the phase retardation of liquid crystal layer 410 in the transmissive region 412 is larger than that in the reflective region 413. By properly designing the width W of the reflective display region and the cell gap d, the phase retardation of liquid crystal layer 410 in the transmissive display region 412 can be made approximately twice that in the reflective display region 413. Because the ambient incident beam passes through the reflective display region 413 twice while the beam from the backlight source passes through the transmissive display region 412 only once, these two beams experience approximately the same overall phase retardation. As a result, the grayscales of both transmissive display mode and reflective display mode approximately overlap each other.

Figure 7A:
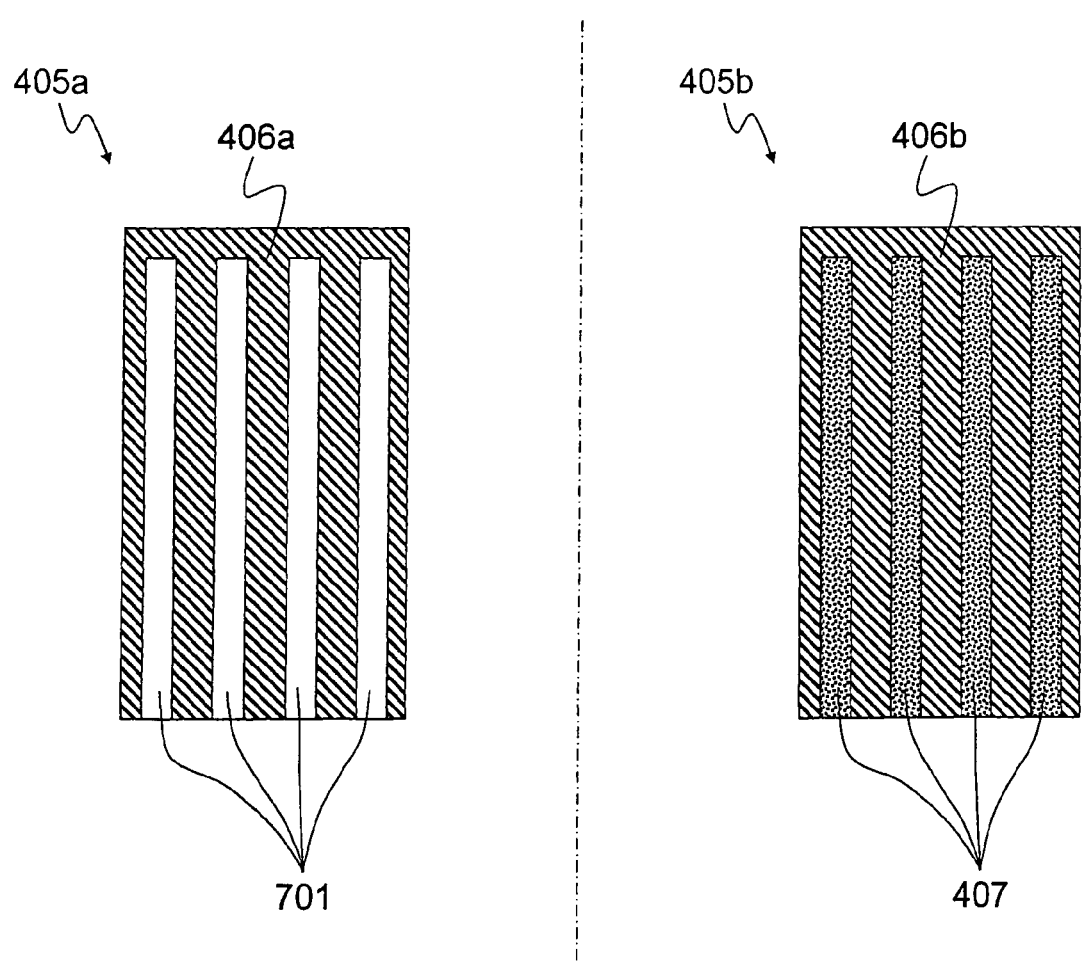
FIG. 7A is a top view of a first example of the mutually complementary common electrode pattern on the first substrate and reflector pattern on the second substrate corresponding to the embodiment shown in FIG. 4.
Figure 7B:
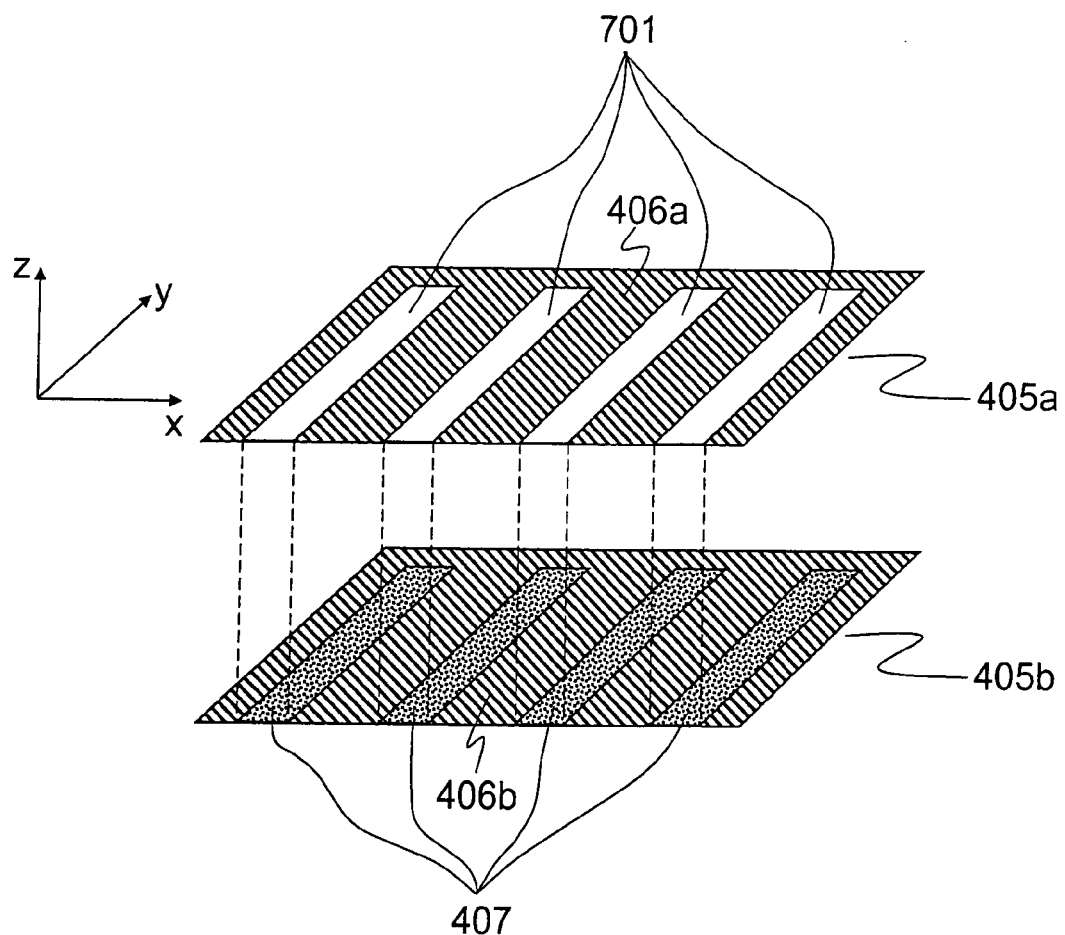
FIG. 7B shows the oblique view of the first example of the mutually complementary common electrode pattern on the first substrate and reflector pattern on the second substrate corresponding to the embodiment shown in FIG. 4.

In order that the transmissive display region 412 is governed by longitudinal electric field while the reflective display region 413 is governed by a fringing field, the ITO common electrode pattern on the first substrate 405a should be approximately mutually complementary to the reflector pattern on the second substrate 405b. FIG. 7A shows the top view of a first example of the mutually complementary common electrode pattern 406a and reflector pattern 407. On the first substrate 405a, one portion of the pixel area is occupied by the ITO electrode pattern 406a, while the other portion of the pixel area is left as an empty area 701 and without ITO electrode coverage. On the second substrate 405b, the whole pixel is covered by a non-patterned ITO pixel electrode 406b, which is further covered by a patterned reflector 407. The area of the reflector pattern 407 on the second substrate 405b approximately matches with the empty area 701 on the first substrate 405a. Therefore, the ITO pattern 406a on the first substrate 405a is approximately mutually complementary with the reflector pattern 407 on the second substrate 405b. To get a better understanding of the mutually complementary relationship, FIG. 7B shows the oblique view of the first example of the mutually complementary common electrode pattern 406a on the first substrate 405a and reflector pattern 407 on the second substrate 405b. In fact, it is not necessary for the reflector pattern 407 on the second substrate 405b to exactly match with the empty area 701 on the first substrate 405a. Mismatches, overlaps or even gaps can exist between the reflector pattern 407 on the second substrate 405b and the ITO pattern 406a on the first substrate 405a.

Figure 7C:
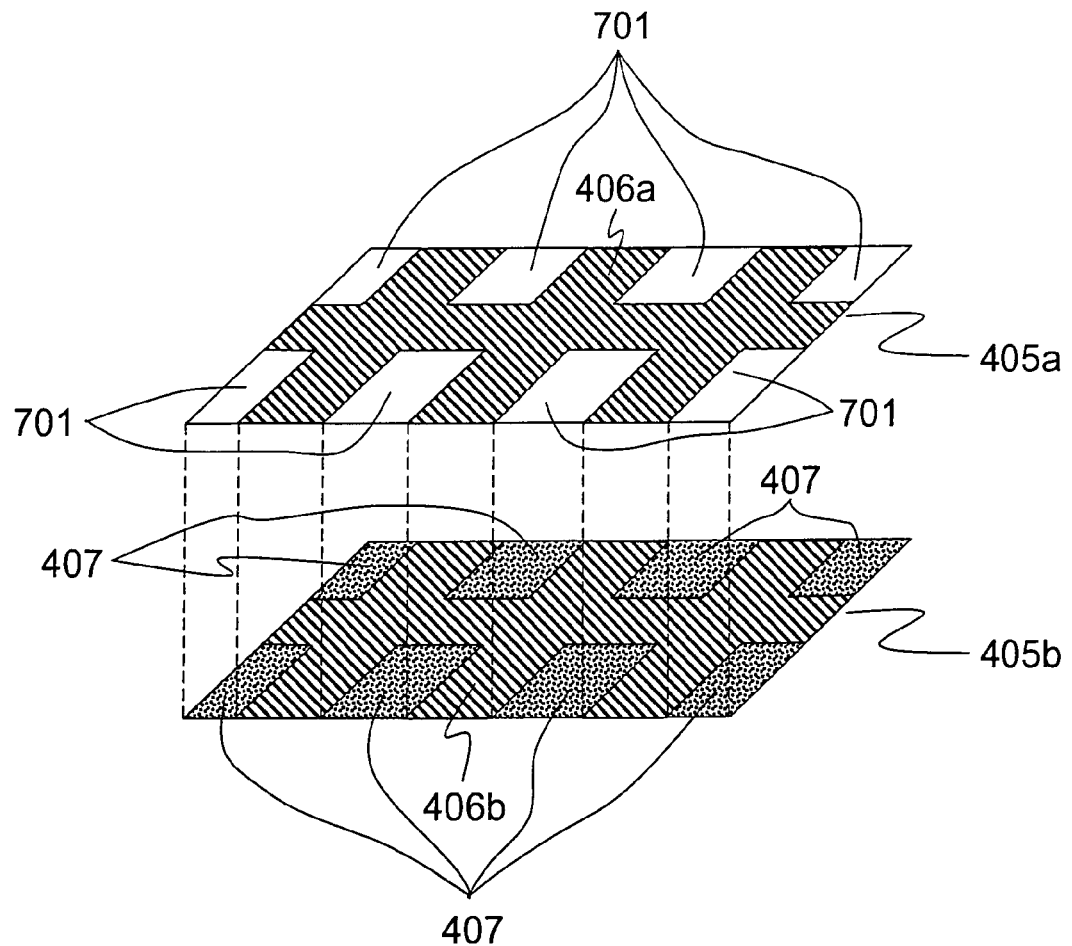
FIG. 7C shows the oblique view of a second example of the mutually complementary common electrode pattern on the first substrate and reflector pattern on the second substrate corresponding to the embodiment shown in FIG. 4.
Figure 7D:
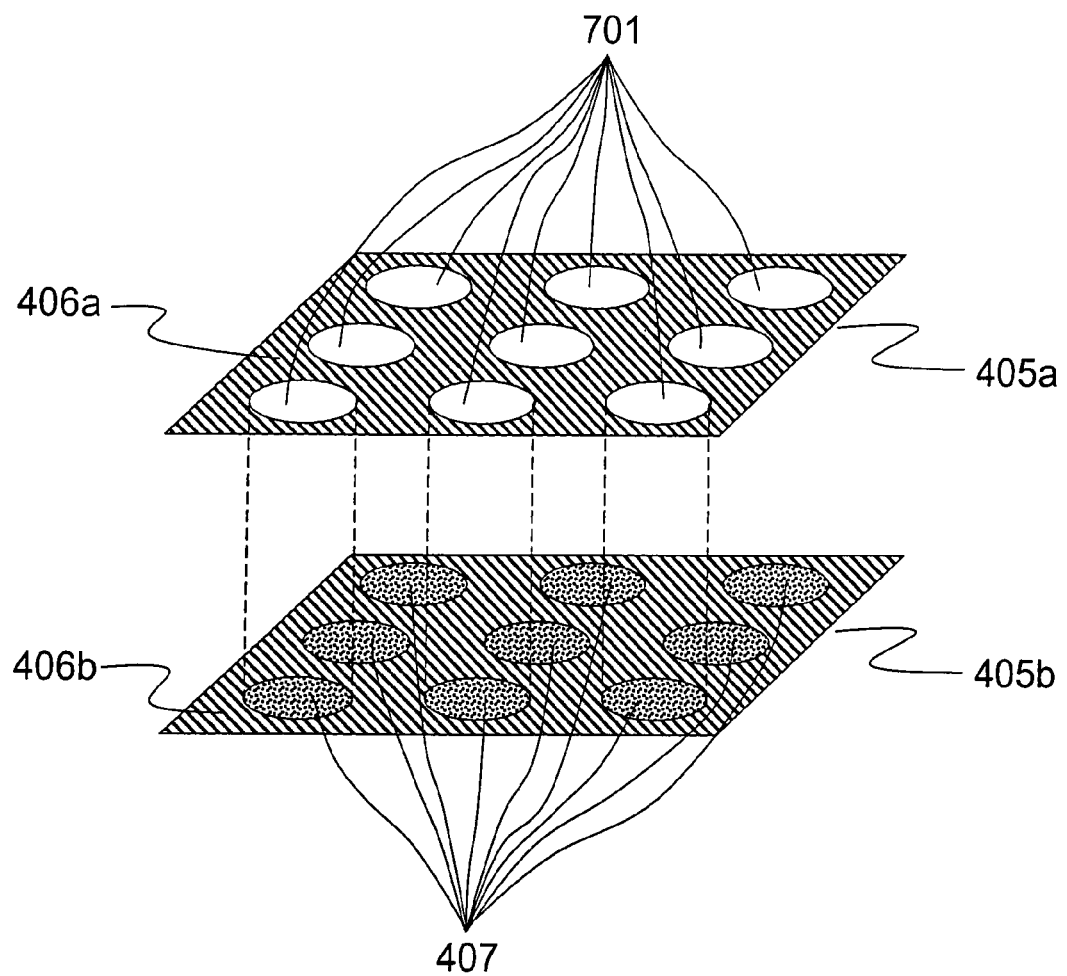
FIG. 7D shows the oblique view of a third example of the mutually complementary common electrode pattern on the first substrate and reflector pattern on the second substrate corresponding to the embodiment shown in FIG. 4.

Besides the comb-shaped ITO electrode 406a and its complementary strip-shaped reflector pattern 407 shown in FIGS. 7A and 7B, the mutually complementary common electrode 406a and reflector pattern 407 can have other pattern designs. For example, FIG. 7C shows an oblique view of a second example of the mutually complementary common electrode pattern 406a and reflector pattern 407, where the common electrode pattern 406a is cross-shaped and its complementary reflector pattern 407 is rectangle-shaped. FIG. 7D shows the oblique view of a third example of the mutually complementary common electrode pattern 406a and reflector pattern 407, where the common electrode pattern 406a has many circular holes and its corresponding complementary circular-shaped reflector pattern 407. In fact, as long as the common electrode pattern 406a and the reflector pattern 407 are approximately mutually complementary with each other, any other mutually complementary common electrode pattern 406a and reflector pattern 407 designs may be substituted in the present invention.

Based on the design principle described above, the voltage dependent transmittance and reflectance are calculated in a simulation program. In the simulation, the panel structure design of FIG. 4 and the electrode design of FIG. 7B are employed. Table 1 is a list of the parameters of the liquid crystal mixture, MLC-6680 in this example, used for the simulation. The liquid crystal pretilt angles on both the first alignment film 409a and the second alignment film 409b are 2° with respect to the substrate normal and the cell gap d is 5 μm in both the transmissive display region 412 and the reflective display region 413. The optical axes of the first half-wave film 402a and the first quarter-wave film 403a make 15° and 75° with the transmission axis of the first polarizer 401a, respectively. The transmission axis of the second polarizer 401b is perpendicular to that of the first polarizer 401a. The optical axis of the second half-wave film 402b is perpendicular to that of the first half-wave film 402a and the optical axis of the second quarter-wave film 403b is perpendicular to that of the first quarter-wave film 403a. The reflector pattern 407 is made of aluminum with reflective index n=0.895+i·6.67.

Figure 8A:
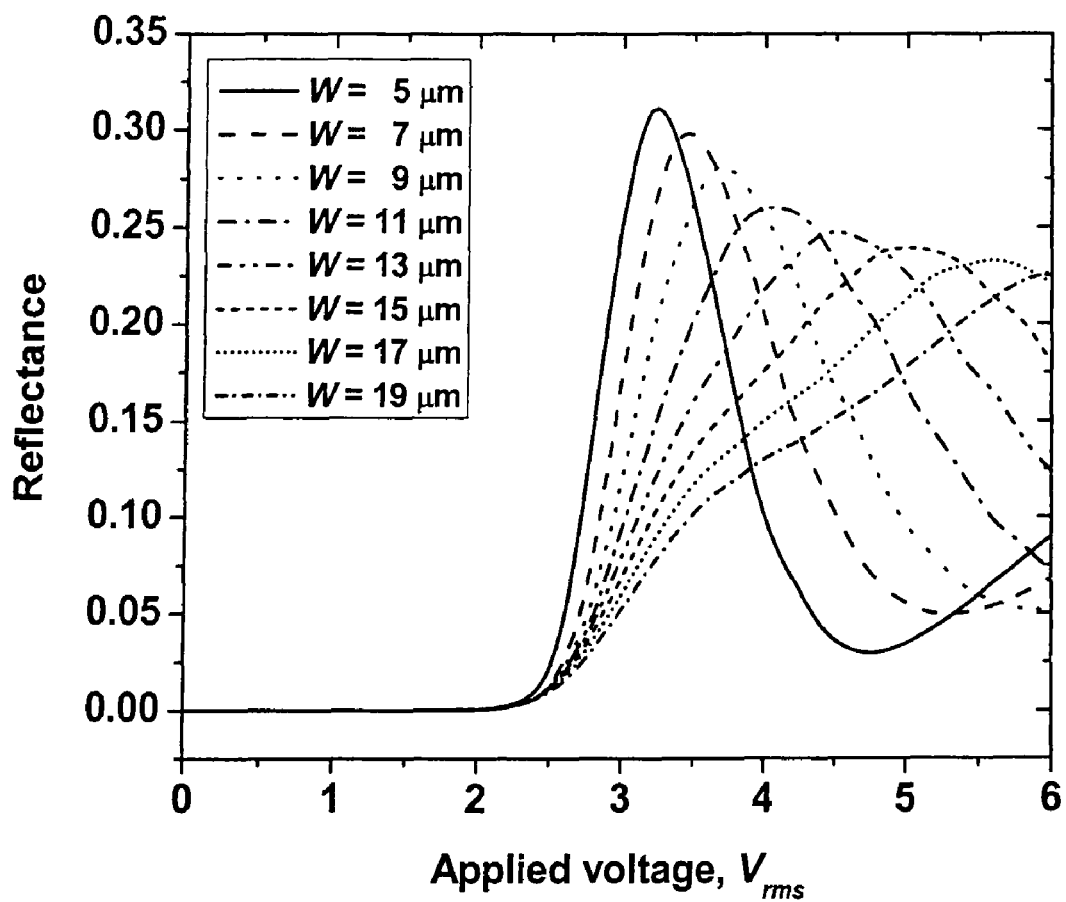
FIG. 8A is a graph of the voltage dependent reflectance curve of the first embodiment of this invention with cell gap d=5 µm and different reflector width W as shown in FIG. 4.
Figure 8B:
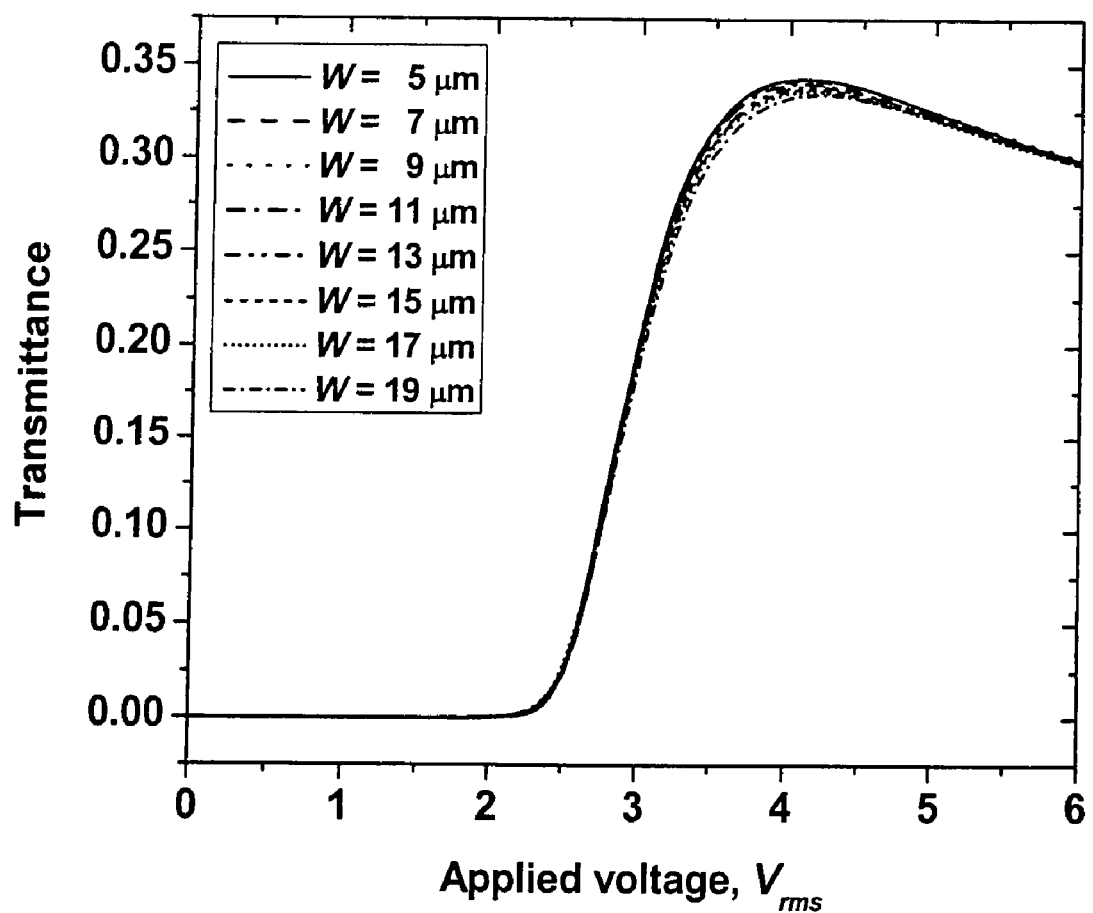
FIG. 8B is a graph of the voltage dependent transmittance curve of the first embodiment of this invention with cell gap d=5 µm and different reflector width W as shown in FIG. 4.
Figure 8C:
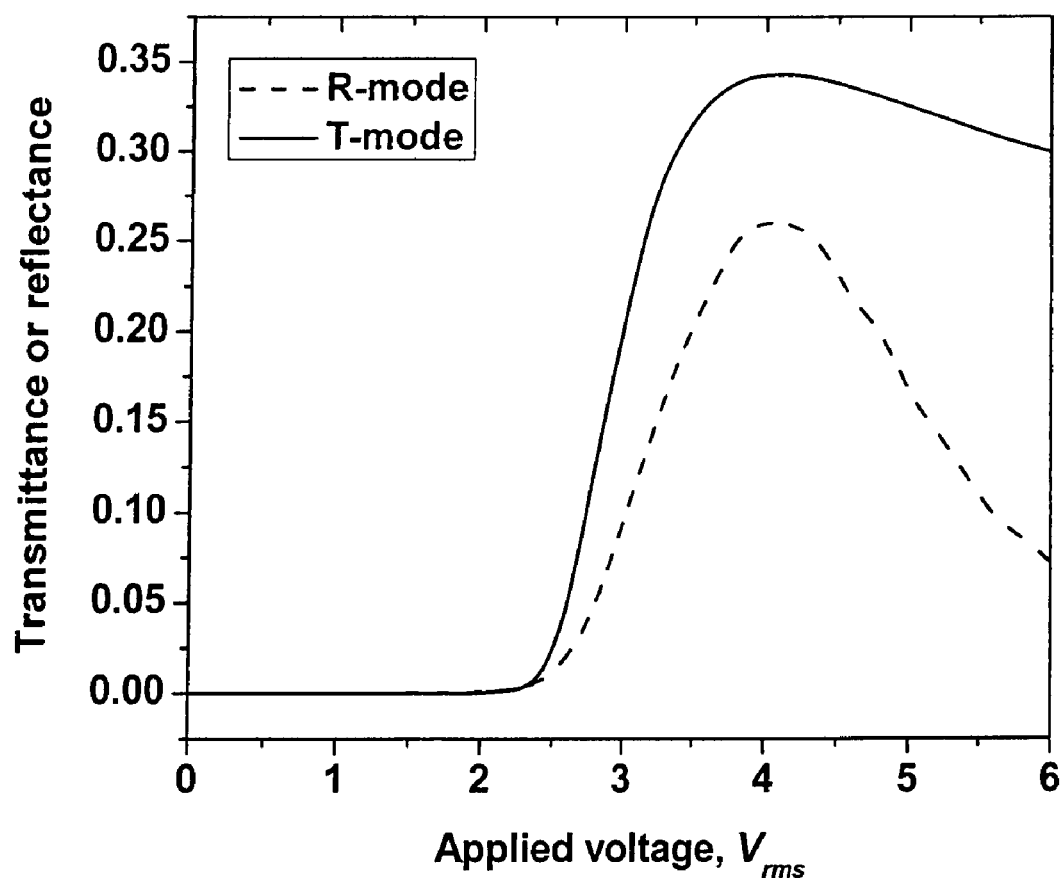
FIG. 8C is a graphical comparison of the voltage dependent transmittance and reflectance curves of the first embodiment of this invention with cell gap d=5 µm and the reflector width W=11 µm as shown in FIG. 4.

FIGS. 8A and 8B are graphs of the voltage dependent reflectance and transmittance curves, respectively, corresponding to the schematic structure shown in FIG. 4 with different reflector width W. In both reflective and transmissive display modes, the ambient incident angle and the detect angle are 0°. From FIG. 8A, it is clear that, in reflective display mode, when the reflector width W changes from 5 µm to 19 µm, the maximum reflectance drops continuously and the on-state voltage increases gradually. Conversely, in the transmissive display mode, FIG. 8B shows that the maximum transmittance and on-state voltage are approximately constant. This is because the longitudinal electric field $E_T$ in the transmissive display region 412 is almost unaffected by the reflector width W; however, the fringing field $E_R$ in the reflective display region 413 is mainly affected by the reflector width W. To design a high image quality transflective LCD, the grayscales of both reflective and transmissive display modes are highly preferable to overlap with each other. The graph in FIG. 8C shows the voltage dependent transmittance and reflectance curves for the first embodiment of the present invention with cell gap d=5 µm and the reflector width W=11 µm. As shown in FIG. 8C, the grayscales of both reflective and transmissive display modes approximately overlap. In addition, both modes have approximately the same threshold voltage and on-state voltage. These characteristics make a transflective LCD easy to drive, and more importantly, easy to view.

TABLE 1

The parameters of MLC-6608 liquid crystal mixture

| | |
|---|---|
| $K_{11}$ | $16.7 \times 10^{-12}$ N |
| $K_{22}$ | $7.0 \times 10^{-12}$ N |
| $K_{33}$ | $18.1 \times 10^{-12}$ N |
| $\epsilon_{//-}$ | 3.6 |
| $\epsilon_\perp$ | 7.8 |
| $n_e$ | 1.5606 (at λ = 550 nm) |
| $n_o$ | 1.4770 (at λ = 550 nm) |

Figure 9A:
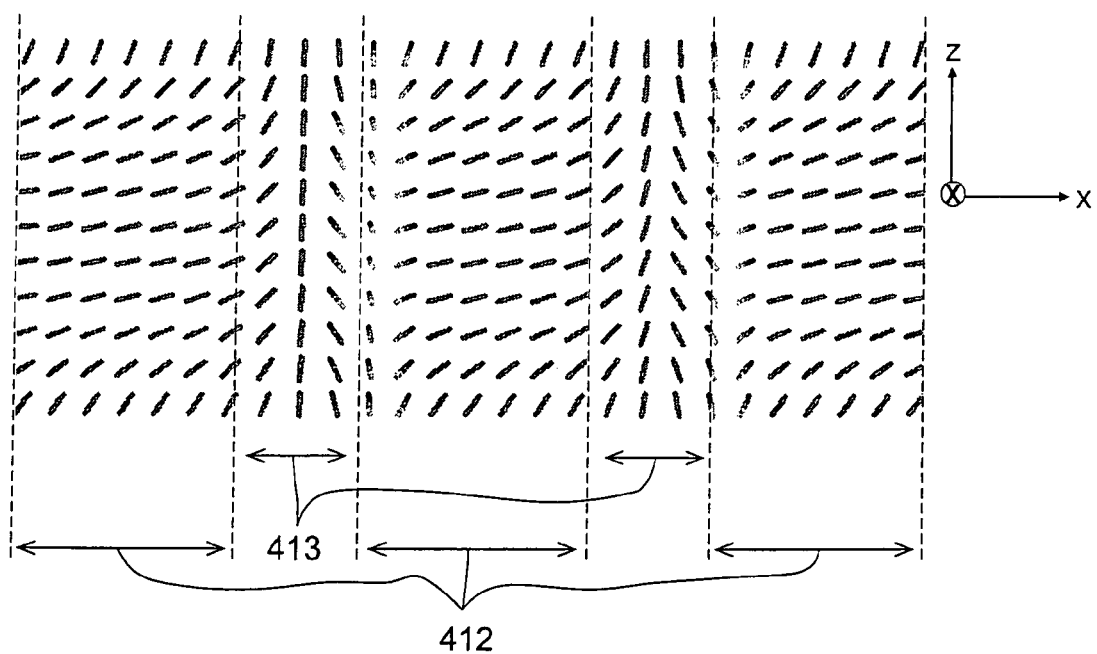
FIG. 9A is a sectional view of the equilibrium state director distribution with the strip electrode design of FIG. 7B when rubbing direction is along x-axis direction.
Figure 9B:
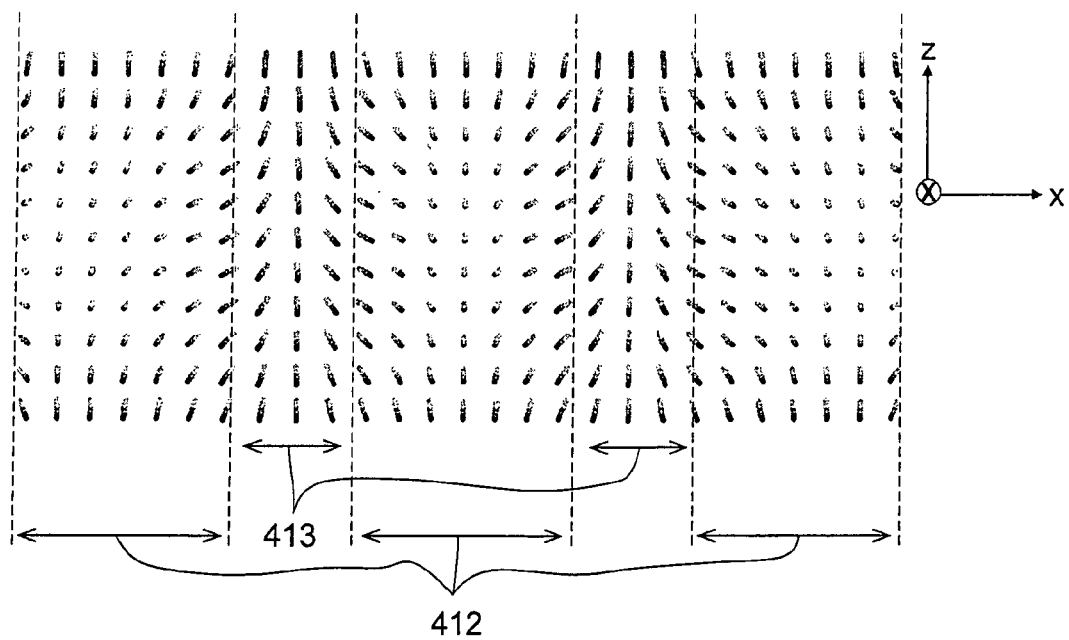
FIG. 9B is a sectional view of the equilibrium state director distribution with the strip electrode design of FIG. 7B when rubbing direction is along y-axis direction.
Figure 9C:
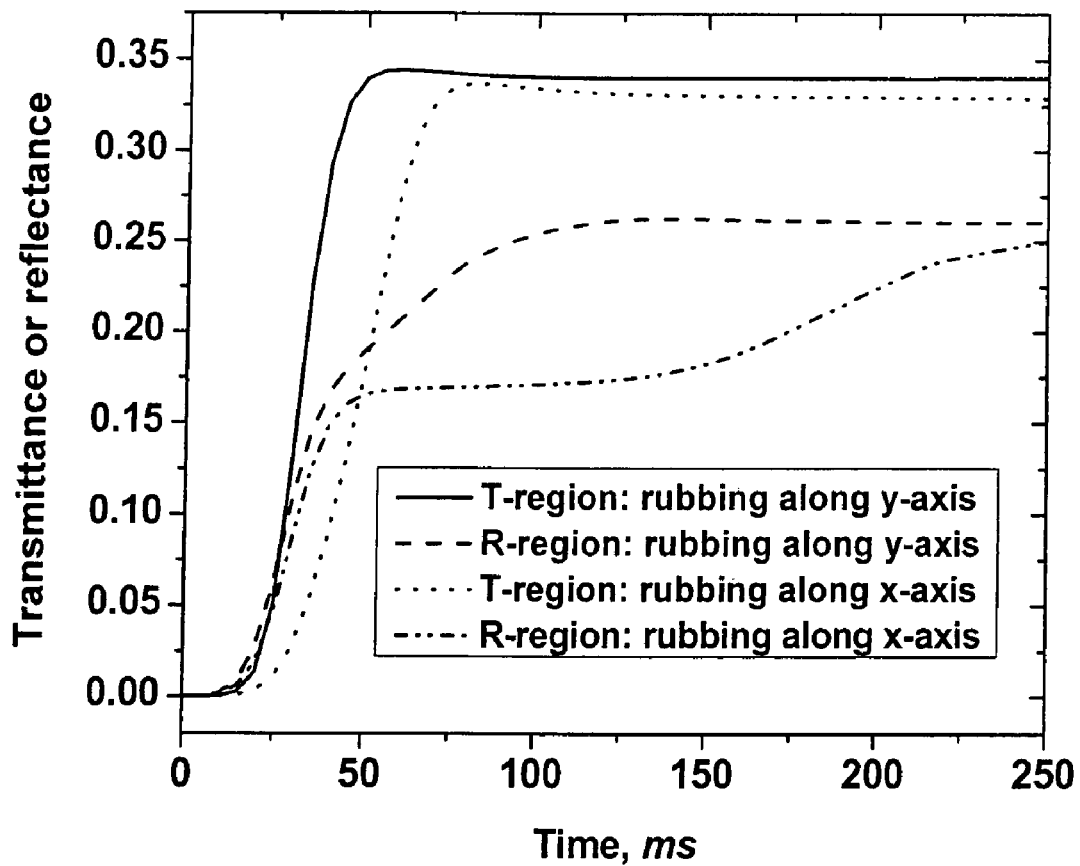
FIG. 9C is a graph illustrating the rise period dynamic response for different rubbing direction cases in the first embodiment of the invention.

The rubbing directions of both the first alignment film 409a and the second alignment film 409b play important roles on image brightness and dynamic response speed. Given the strip electrode design of FIG. 7B as an example, if the rubbing direction is along x-axis direction, which is perpendicular to the strip direction of the reflector pattern 407, then the rise period response speed of both reflective display mode and transmissive display mode is slow. FIG. 9A shows a section view of the equilibrium state director distribution with the strip electrode design of FIG. 7B when rubbing direction is along x-axis direction. Since the fringing field $E_R$ in the reflective display region 413 is weaker than the longitudinal electric field $E_T$ in the transmissive display region 412, the liquid crystal molecules in the transmissive display region 412 tilt along x-axis direction first and those in the reflective display region 413 are pushed and pressed. Contrarily, the reoriented liquid molecules in the reflective display region 413 push and press the liquid crystal molecules in the transmissive display region 412. As a result of the interaction, the liquid crystal molecules on the border of the reflective display region 413 and the transmissive display region 412 deviate out of the x-z plane. In other words, twist deformation evolution occurs on the border of the reflective display region 413 and the transmissive display region 412. This twist deformation evolution of liquid crystal molecules consumes a long time; therefore, its rise period dynamic speed is slow. On the other hand, if the rubbing direction is along y-axis direction, which is parallel to the strip direction of the reflector pattern 407 as shown in FIG. 7B, then the rise period response speed of both reflective display mode and transmissive mode is relatively fast. FIG. 9B shows the section view of the equilibrium state director distribution with the strip electrode design of FIG. 7B when the rubbing direction is along y-axis. In this example, since the rubbing direction is parallel to the strip direction of the reflector pattern 407, the liquid crystal molecules in both the transmissive display region 412 and the reflective display region 413 reorient in the y-z plane and no twist deformation occurs in the whole pixel area. Therefore, when rubbing direction is along the strip direction of the reflector pattern 407, the dynamic rise time is much faster. For comparison purposes, FIG. 9C shows the dynamic response rise period for different rubbing directions. As shown in FIG. 9C, when the rubbing direction is along y-axis, which is parallel to the strip direction of the reflector pattern 407, the response speed is faster and the brightness is higher. Therefore, for the strip shape reflector pattern, the rubbing angle is preferably parallel to the strip direction of the reflector pattern.

Second Embodiment

Figure 10:
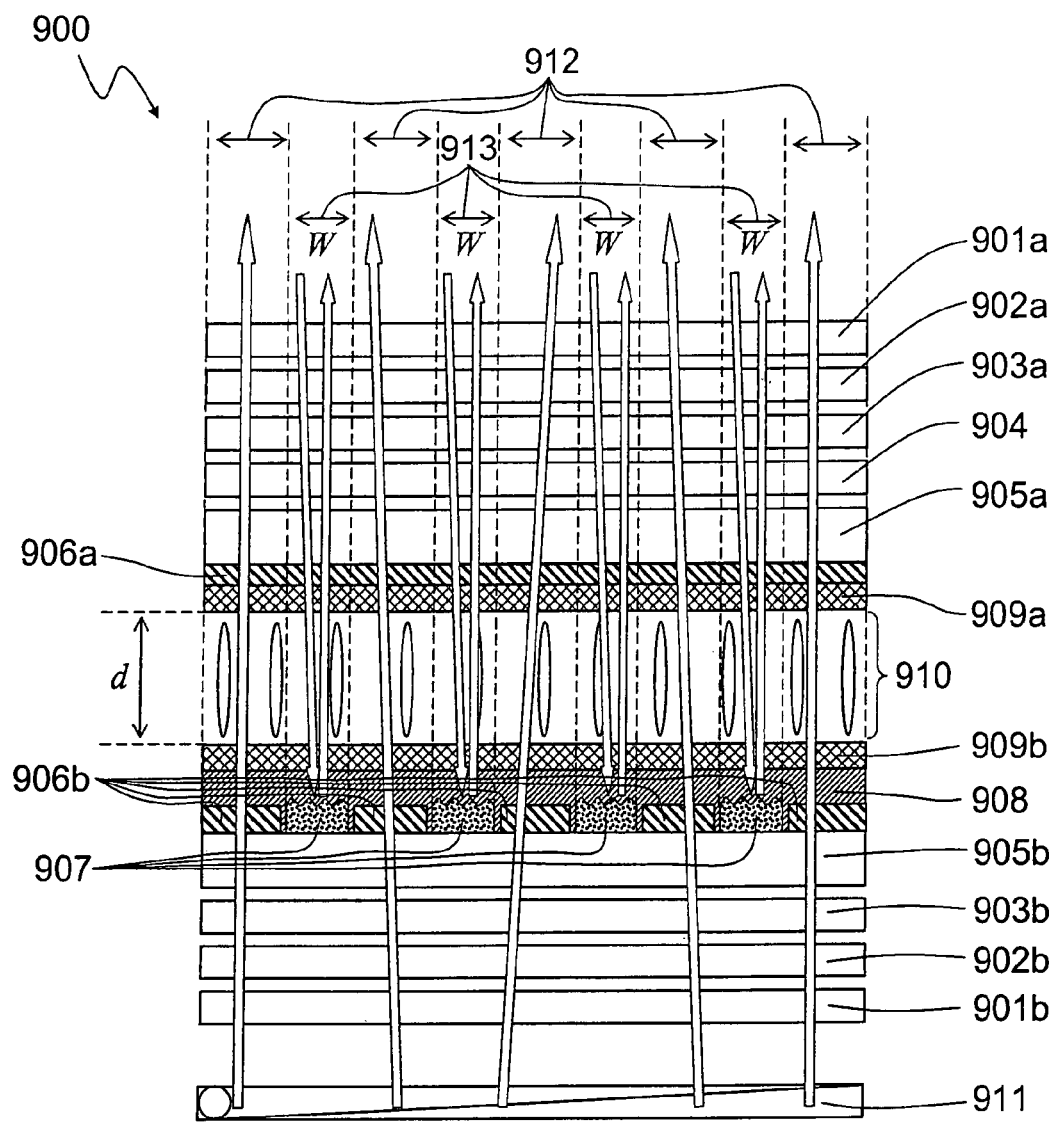
FIG. 10 shows the schematic structure of the transflective LCD according to a second embodiment of the invention.

In the first embodiment, the common electrode pattern on the first substrate is mutually complementary with the reflector pattern on the second substrate; therefore, the first substrate aligns with the second substrate. To avoid that alignment requirement, FIG. 10 shows the schematic structure according to the second embodiment of the transflective LCD 000 with uniform cell gap configuration according to the present invention. The structure in the second embodiment includes a first transparent substrate 905a coated with a non-patterned ITO layer 906a and a first vertical alignment film 909a, a second transparent substrate 905b coated with a patterned ITO layer 906b, a patterned reflector 907, a non-conductive planar layer 908, and a second vertical alignment film 909b, a vertically aligned negative dielectric anisotropic nematic liquid crystal layer 910 with thickness d sandwiched between the first vertical alignment film 909a and the second vertical alignment film 909b. A negative birefringence c-film 904, a first quarter-wave retardation film 903a, a first half-wave retardation film 902a, and a first polarizer 901a are further successively laminated outside of the first substrate 905a, wherein the negative birefringence c-film 904 contacts with the first substrate 905a and the first polarizer 901a faces the observer. A second quarter-wave retardation film 903b, a second half-wave retardation film 902b, and a second polarizer 901b are further successively laminated outside of the second substrate 905b. In addition, a backlight source 911 is further provided outside of the second polarizer 901b.

The patterned reflector 907 in the second embodiment may be a high reflectivity conductive metal material, such as aluminum, aluminum alloy, silver and so on. In addition, the patterned reflector 907 may be a nonconductive material, such as a high reflectivity multilayer dielectric thin film. When the patterned reflector 907 is a conductive metal material, then the patterned transparent electrode 906b and patterned reflector 907 are not connected. Therefore, only the patterned transparent electrode 906b functions as the pixel electrode. On the other hand, if the patterned reflector 907 is a nonconductive material, then the patterned transparent electrode 906b and the patterned reflector 907 may be connected however, only the patterned transparent electrode 906b functions as the pixel electrode. In the second embodiment of the present invention, the transparent electrode pattern 906b is approximately mutually complementary with the reflector pattern 907. The hollow arrows in FIG. 10 represent the propagation directions of both the ambient light and the backlight source. As shown in FIG. 10, the patterned ITO layer 906b is further connected with the drain electrode of the thin-film transistor (TFT), which is not shown here. In fact, FIG. 10 only shows the basic structure of a single pixel area of the transflective LCD. Other elements such as the thin-film transistor (TFT), color filter, storage capacitor, data line and gate line, although necessary to drive the display device, are not shown. The area of the patterned ITO layer 906b is defined as the transmissive display region 912, while the area of the patterned reflector 907 is defined as the reflective display region 913. More importantly, the patterned ITO layer 906b, which serves as the pixel electrode, is approximately mutually complementary with the patterned reflector 907. Therefore, the electric field in the transmissive display region 912 is different from that in the reflective display region 913.

Figure 11:
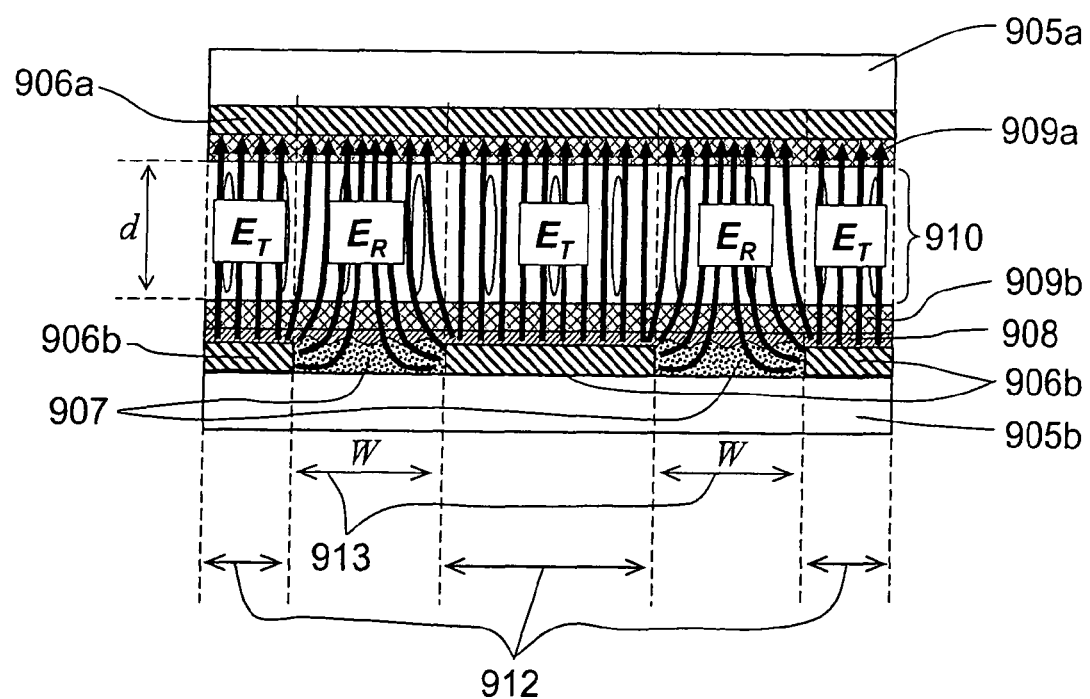
FIG. 11 shows the electric field distribution in both transmissive display region and reflective display region corresponding to the second embodiment.
Figure 12:
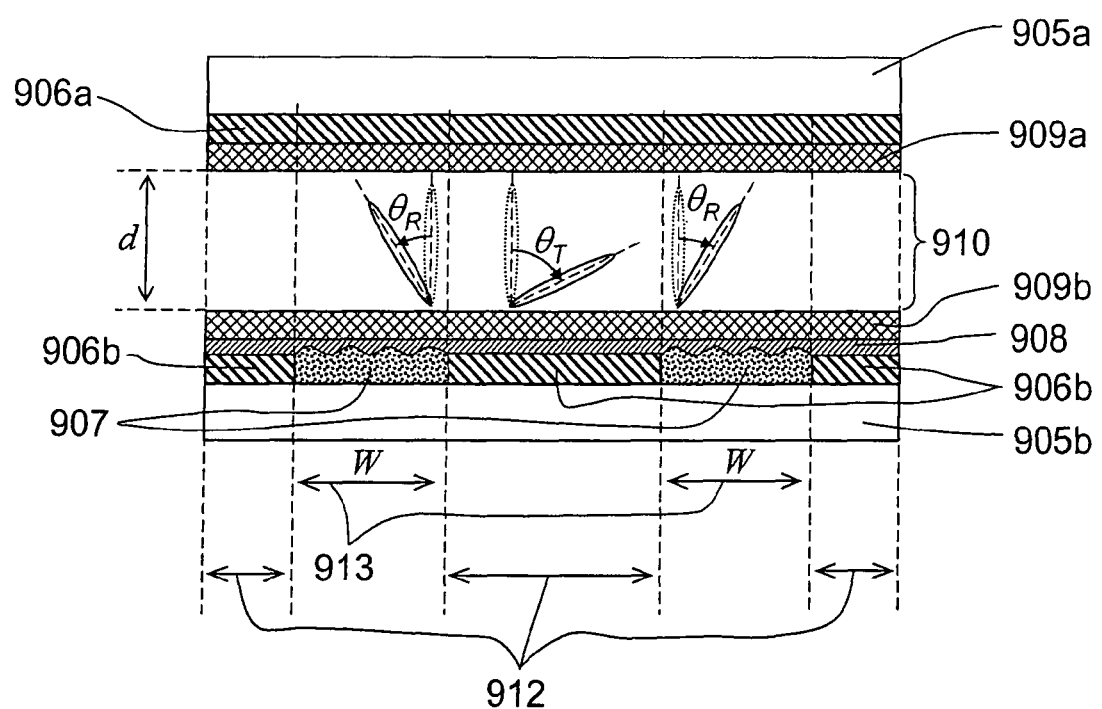
FIG. 12 shows the director distribution in both transmissive display region and reflective display region under the electric field distribution shown in FIG. 11.

FIG. 11 shows the electric field distribution in the transmissive display region 912 and the reflective display region 913 of one pixel area according to the second embodiment. Since the bottom patterned ITO layer 906b only approximately covers the transmissive display region 912 and does not cover the reflective display region 913, the electric field in the transmissive display region 912 is a uniform longitudinal field $E_T$, which is perpendicular to the first substrate 905a and the second substrate 905b. On the other hand, the electric field in the reflective region 913 is a fringing field $E_R$, which has both longitudinal and horizontal components. Consequently, the longitudinal component of $E_T$ in the transmissive display region 912 is stronger than that of $E_R$ in the reflective display region 913. The schematic diagram in FIG. 12 shows the liquid crystal director distribution in both transmissive and reflective display regions corresponding to the electric field distribution as shown in FIG. 11.

Under each applied voltage state, the liquid crystal director in the transmissive display region 912 is tilted at a $\theta_T$ angle with respect to the substrate normal direction, and the liquid crystal director: in the reflective display region 913 is tilted at a $\theta_R$ angle with respect to the substrate normal direction. Since the longitudinal component of $E_T$ in the transmissive display region 912 is stronger than that of $E_R$ in the reflective display region 913 and the initially vertically aligned negative dielectric anisotropic nematic liquid crystal molecules only respond to the longitudinal component of the electric field, the tilt angle $\theta_R$ in the reflective display region 913 is smaller than the tilt angle $\theta_T$ in the transmissive display region 912. As a result, the phase retardation of liquid crystal layer 910 in the transmissive region 912 is larger than that in the reflective region 913. By properly designing the width W of the reflective display region and the cell gap d, the phase retardation of liquid crystal layer 910 in the transmissive display region 912 can be made approximately twice the phase retardation of liquid crystal layer 910 in the reflective display region 913. Because the ambient incident beam passes through the reflective display region 913 twice while the beam from the backlight source passes through the transmissive display region 912 only once, these two beams experience approximately the same phase retardation. As a result, the grayscales of both transmissive display mode and reflective display mode approximately overlap.

Figure 13A:
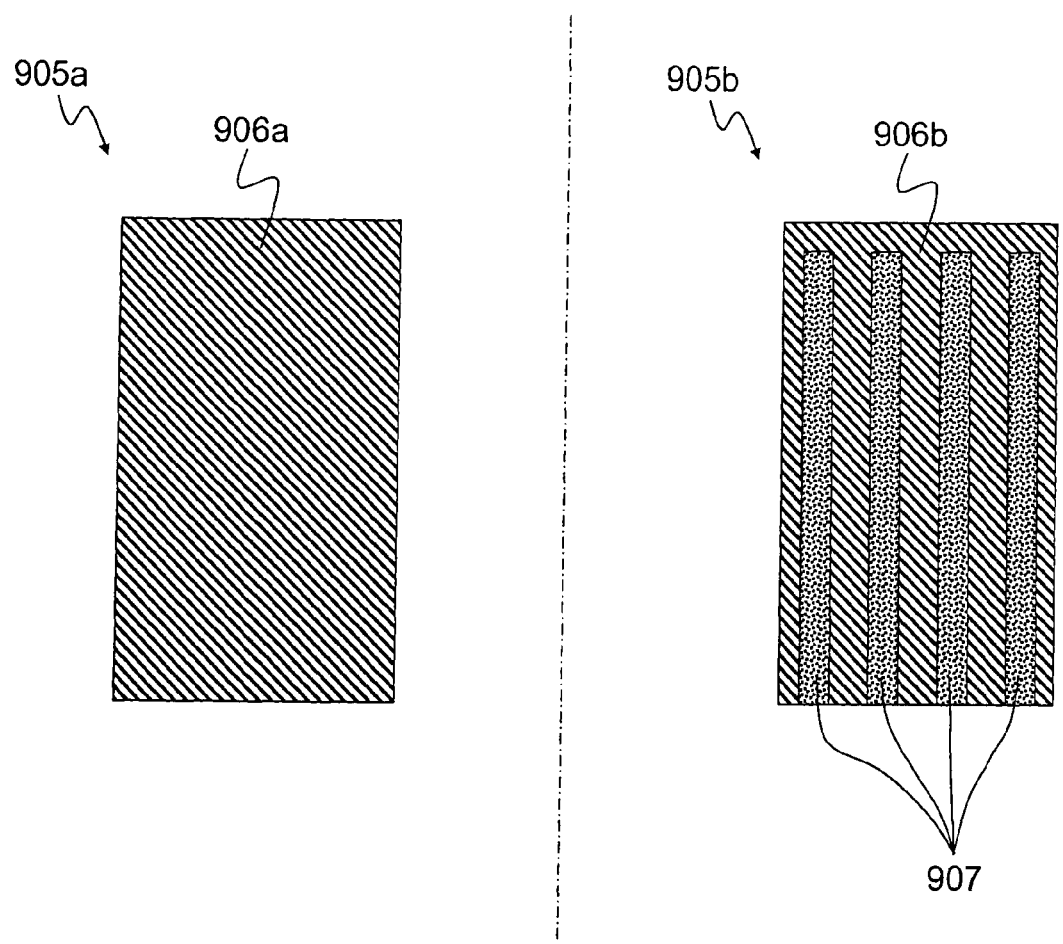
FIG. 13A shows the top view of a first example of the mutually complementary ITO electrode pattern and reflector pattern on the second substrate according to the second embodiment of the present invention.
Figure 13B:
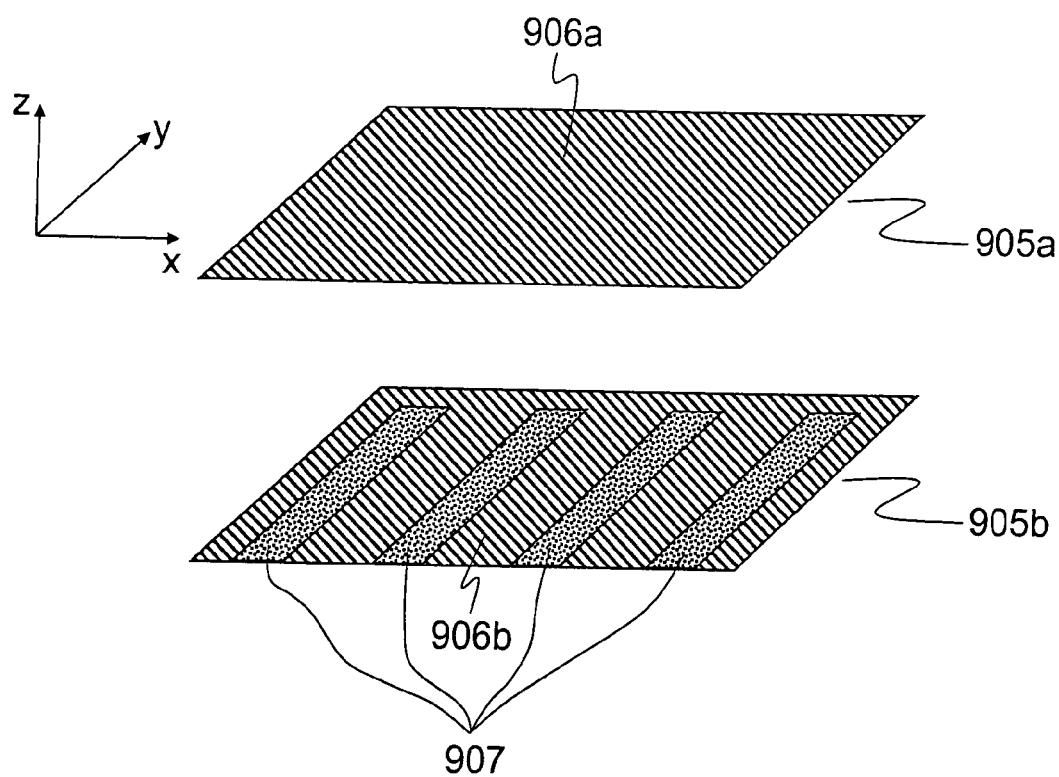
FIG. 13B shows the oblique view of the first example of the mutually complementary ITO electrode pattern and reflector pattern on the second substrate according to the second embodiment.

The patterned ITO electrode 906b on the second substrate 905b should be approximately mutually complementary to the reflector pattern 907 on the second substrate 905b so that the transmissive display region 912 is governed by longitudinal electric field while the reflective display region 913 is governed by a fringing field. FIG. 13A shows the top view of a first example of the mutually complementary ITO electrode pattern 906b and reflector pattern 907. On the first substrate 905a, the ITO electrode 906a is non-patterned. On the second substrate 905b, one portion is covered by a patterned ITO pixel electrode 906b, while the other portion is covered by a complimentarily patterned reflector 907. The ITO pattern 906b is approximately mutually complementary with the reflector pattern 907 on the second substrate 905b. FIG. 13B shows the oblique view of the first example of the mutually complementary ITO electrode pattern 906b and reflector pattern 907 on the second substrate 905b. In fact, the reflector pattern 907 does not need to be exactly complementary with the ITO pattern 906b on the second substrate 905b. Mismatches and gaps may exist between the reflector pattern 907 and the ITO pattern 906b on the second substrate 905b.

Figure 13C:
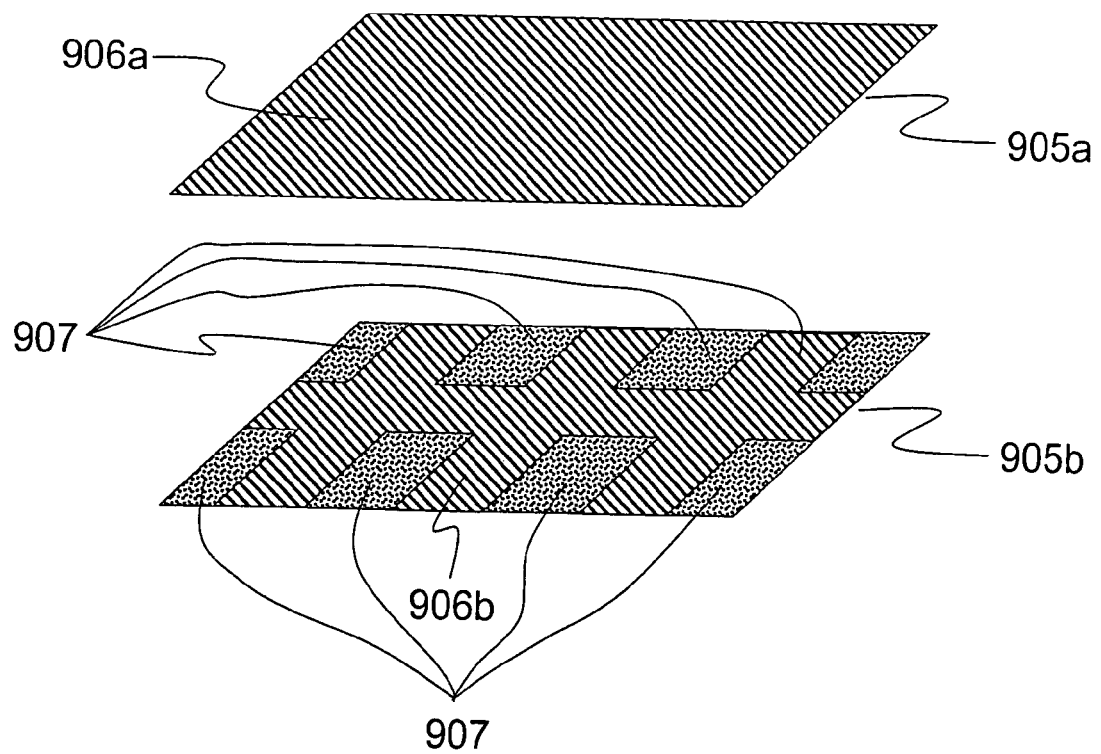
FIG. 13C shows the oblique view of a second example of the mutually complementary ITO electrode pattern and reflector pattern on the second substrate according to the second embodiment of the present invention.
Figure 13D:
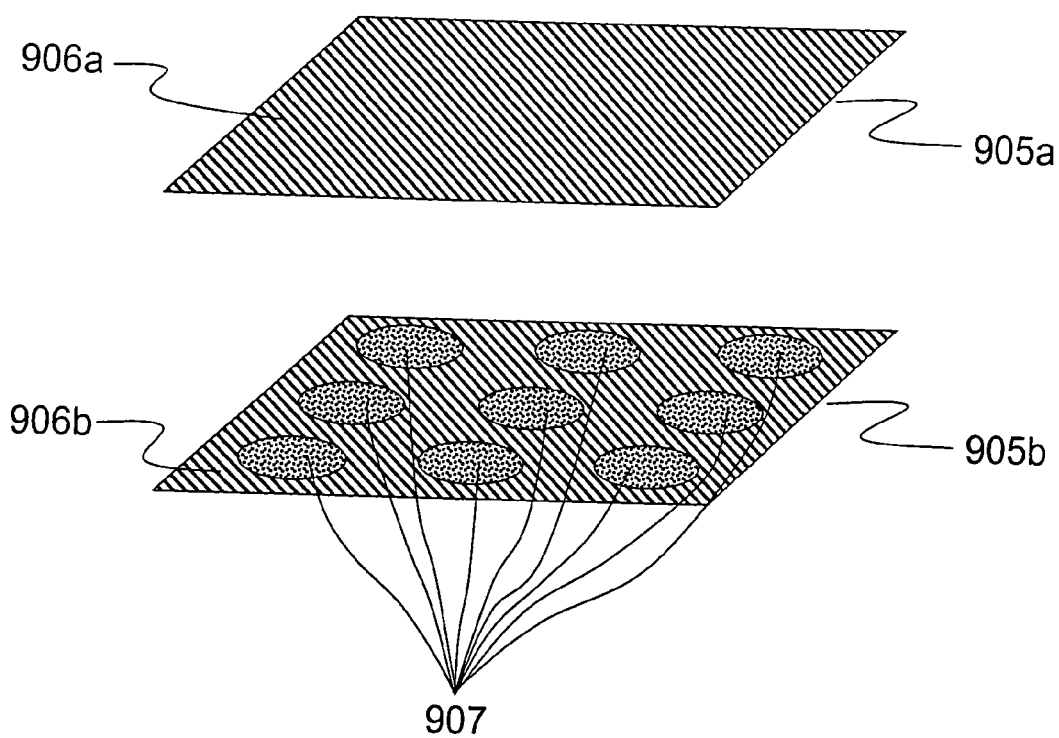
FIG. 13D shows the oblique view of a third example of the mutually complementary ITO electrode pattern and reflector pattern on the second substrate in the second embodiment of the present invention.

Besides the comb-shaped ITO electrode 906b and its complementary strip-shaped reflector pattern 907 shown in FIGS. 13A and 13B, the mutually complementary ITO electrode 906b and reflector pattern 907 may have alternative pattern designs. For example, FIG. 13C shows the oblique view of a second example of mutually complementary ITO electrode pattern 906b and reflector pattern 907, where the ITO electrode pattern 906b is cross-shaped and its complementary reflector pattern 907 is rectangle-shaped. FIG. 13D shows the oblique view of a third example of the mutually complementary ITO electrode pattern 906b and reflector pattern 907, where the ITO electrode pattern 906b has circular holes and its corresponding complementary reflector pattern 907 is circle-shaped. In fact, as long as the ITO electrode pattern 906b and the reflector pattern 907 are approximately mutually complementary with each other, any other mutually complementary ITO electrode pattern 906b and reflector pattern 907 designs may be substituted in the present invention.

Based on the design principle described above, the voltage dependent transmittance and reflectance were calculated with a simulation program. In the simulation, the panel structure design of FIG. 10 and the electrode design of FIG. 13B were employed. The liquid crystal mixture MLC-6608 was used and the parameters of the liquid crystal mixture are listed in Table 1. The liquid crystal pretilt angles on both the first alignment film 909a and the second alignment film 909b were 2° with respect to the substrate normal and the cell gap d was 5 μm in both transmissive display region 912 and reflective display region 913. The optical axes of the first half-wave film 902a and the first quarter-wave film 903a make 15° and 75° with the transmission axis of the first polarizer 901a, respectively. The transmission axis of the second polarizer 901b is perpendicular to that of the first polarizer 901a. The optical axis of the second half-wave film 902b is perpendicular to that of the first half-wave film 902a and the optical axis of the second quarter-wave film 903b is perpendicular to that of the first quarter-wave film 903a. The reflector pattern 907 is made of aluminum with reflective index n=0.895+i-6.67.

Figure 14A:
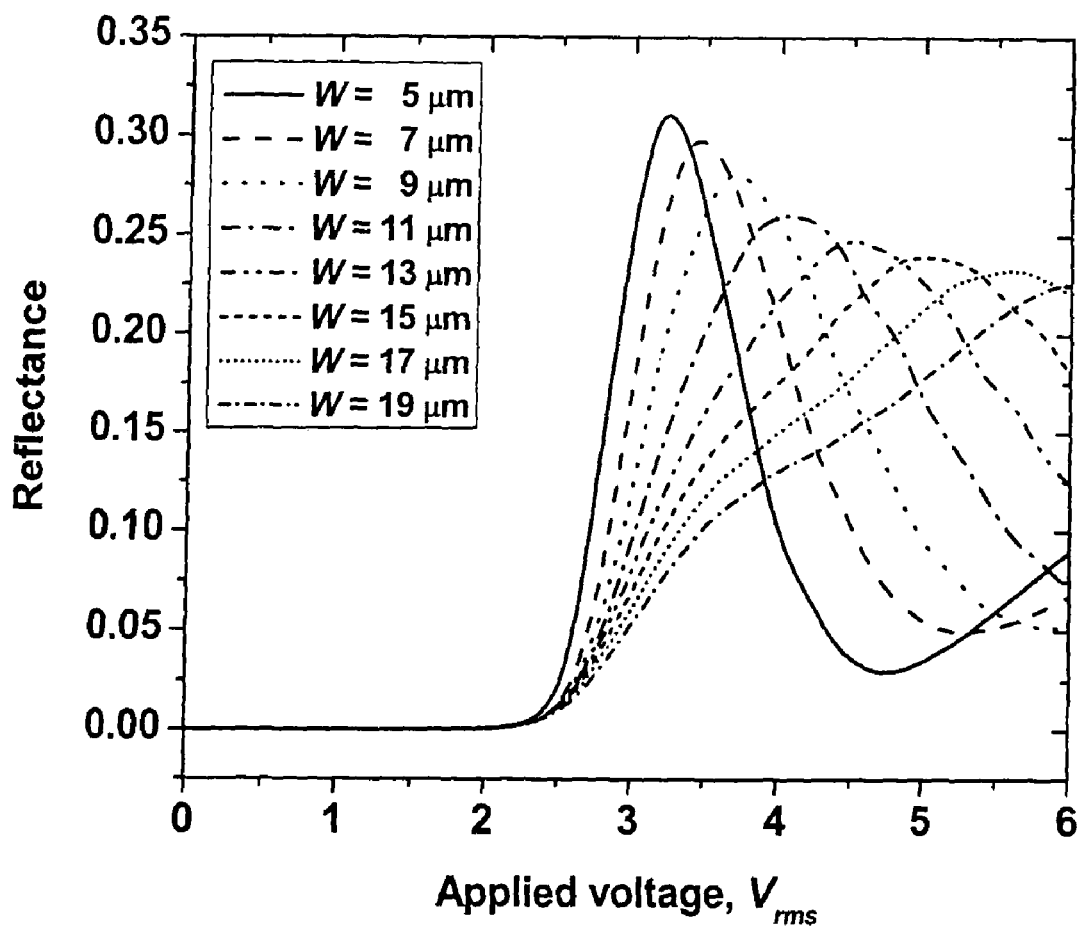
FIG. 14A is a graph illustrating the voltage dependent reflectance curve of corresponding to the second embodiment of the invention with cell gap d=5 µm and different reflector width W as shown in FIG. 10.
Figure 14B:
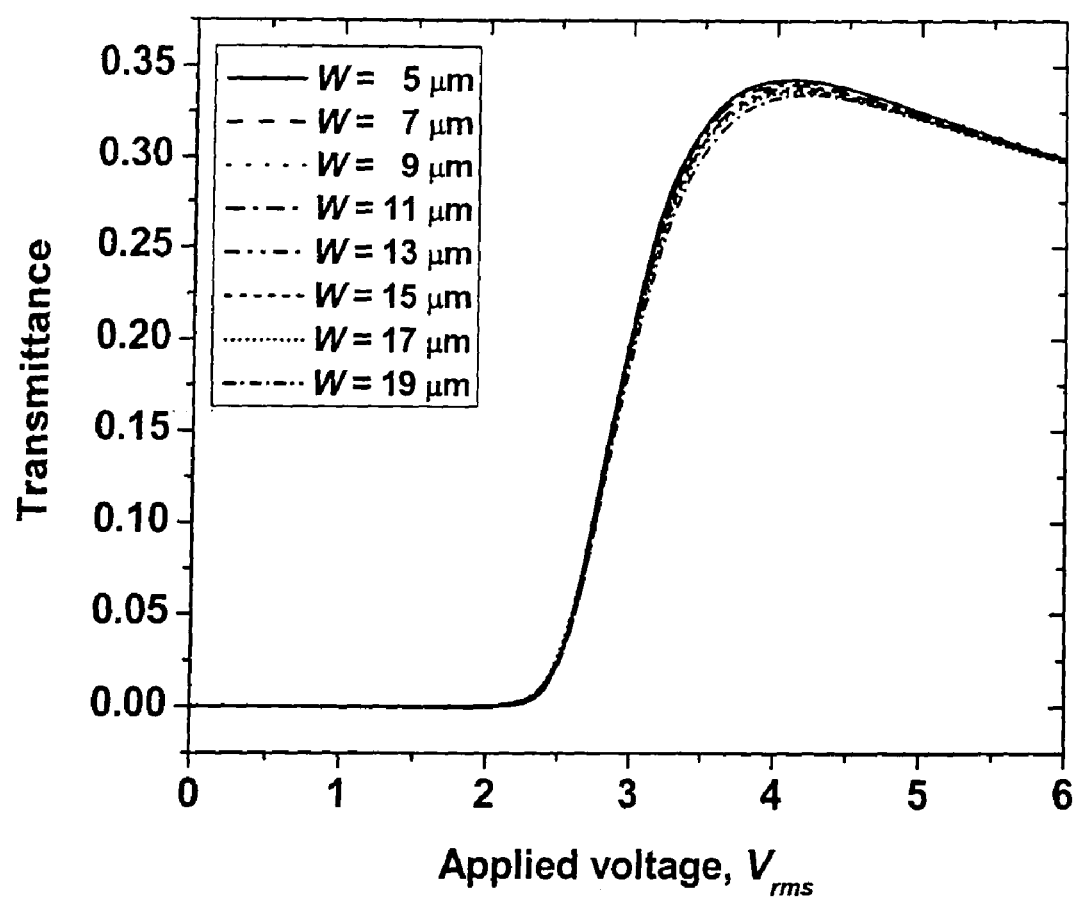
FIG. 14B is a graph illustrating the voltage dependent transmittance curve of the second embodiment of the invention with cell gap d=5 µm and different reflector width W as shown in FIG. 10.
Figure 14C:
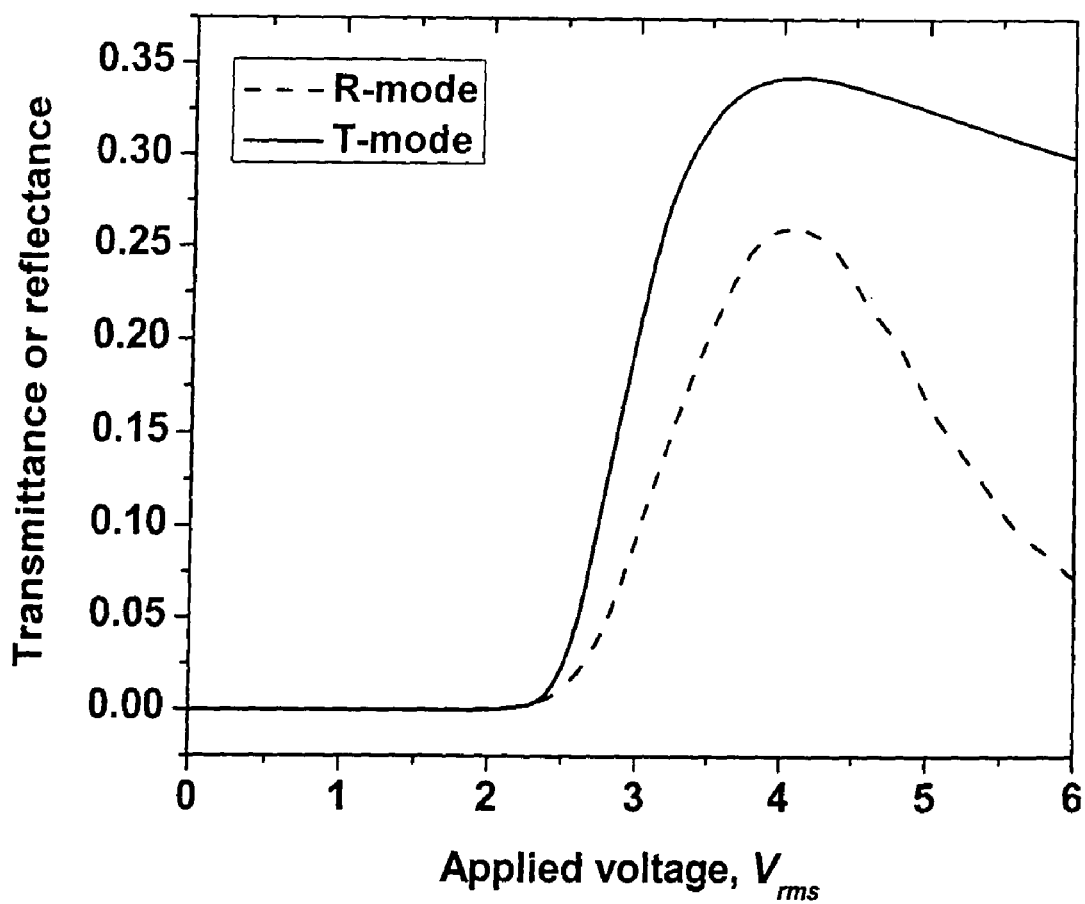
FIG. 14C is a graphical comparison of the voltage dependent transmittance and reflectance curves of the second embodiment of the invention with cell gap d=5 µm and the reflector width W=11 µm as shown in FIG. 10.

FIGS. 14A and 14B demonstrate the voltage dependent reflectance curves and the voltage dependent transmittance curves, respectively, of the second embodiment of FIG. 10 according to the present invention with different reflector widths W. In both reflective and transmissive display modes, the ambient incident angle and the detect angle are 0°. From FIG. 14A, it is clear that, in the reflective display mode, when the reflector width W changes from 5 μm to 19 μm, the maximum reflectance drops continuously and the on-state voltage increases gradually. In contrast, in the transmissive display mode, FIG. 14B shows that the maximum transmittance and on-state voltage is approximately constant because the longitudinal electric field $E_T$ in the transmissive display region 912 is negligibly affected by the reflector width W. Unlike the transmissive display region 912, the fringing field $E_R$ in the reflective display region 913 is affected by the reflector width W. Therefore, to produce a high image quality transflective LCD, the grayscales of both reflective and transmissive display modes preferably overlap. FIG. 14C shows the voltage dependent transmittance and reflectance curves of the second embodiment of this invention with cell gap d=5 μm and the reflector width W=11 μm. From this figure, the grayscales of both reflective and transmissive display modes overlap. In addition, both modes have approximately the same threshold voltage and on-state voltage. These characteristics make the transflective LCD of the present invention easy to drive, and more importantly, easy to view.

Figure 15A:
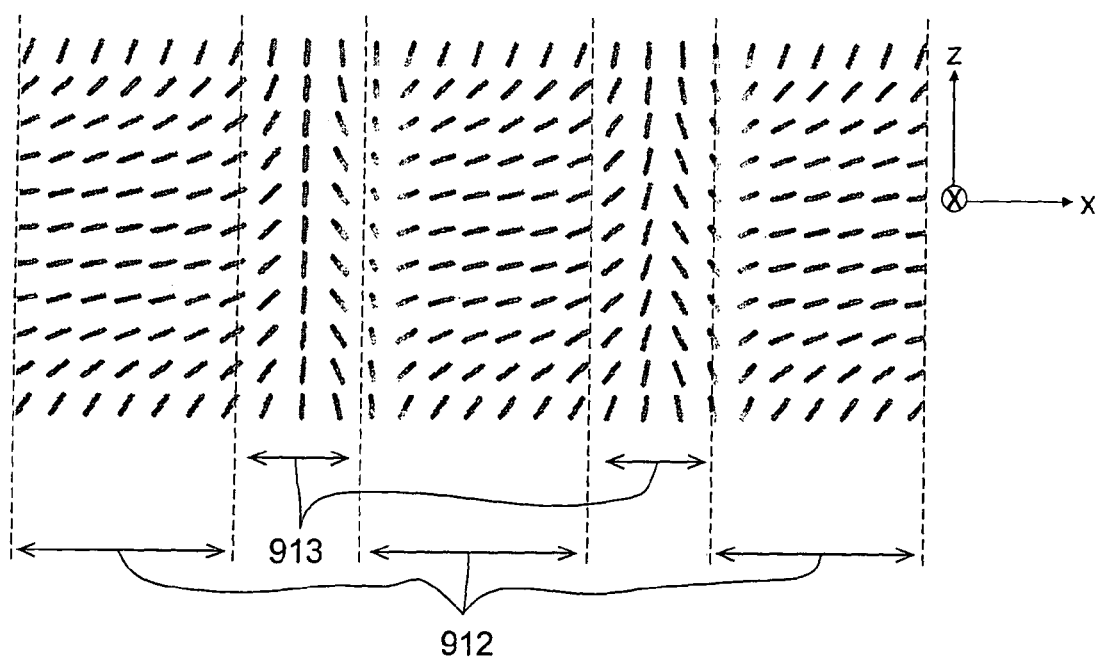
FIG. 15A illustrates a section view of the equilibrium state director distribution with the strip electrode design of FIG. 13B when rubbing direction is along x-axis direction.
Figure 15B:
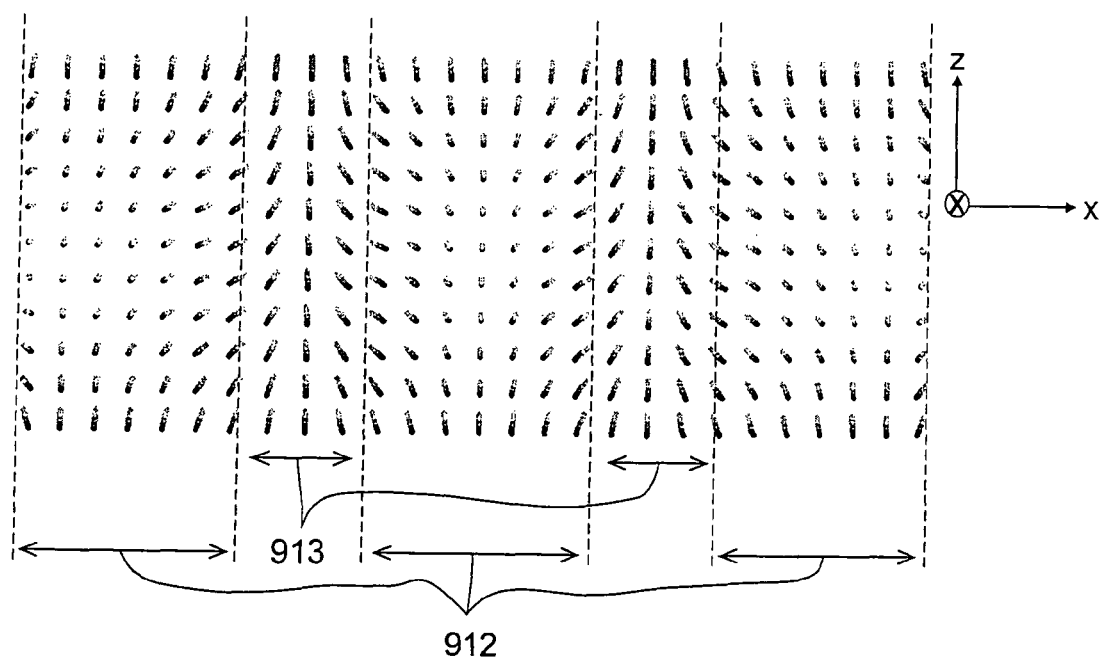
FIG. 15B illustrates a section view of the equilibrium state director distribution with the strip electrode design of FIG. 13B when rubbing direction is along y-axis direction.
Figure 15C:
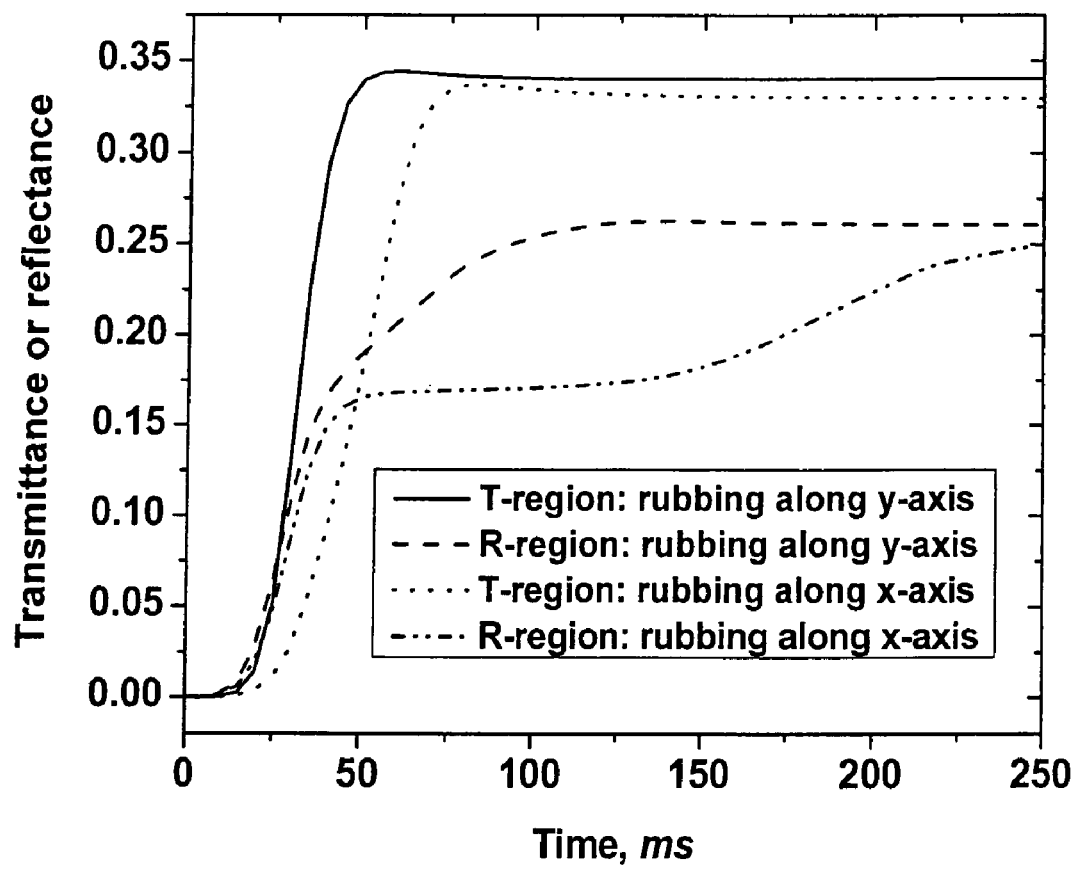
FIG. 15C is a graph showing the rise period dynamic response for different rubbing direction cases according to the second embodiment.

The rubbing directions of both the first alignment film 909a and the second alignment film 909b affect the image brightness and dynamic response speed. Given the strip electrode design of FIG. 13B as an example, if the rubbing direction is along x-axis direction, which is perpendicular to the strip direction of the reflector pattern 907, then the rise period response speed of both the reflective display mode and the transmissive display mode are slow. FIG. 15A shows the section view of the equilibrium state director distribution with the strip electrode design of FIG. 13B when rubbing direction is along x-axis direction. Since the fringing field $E_R$ in the reflective display region 913 is weaker than the longitudinal electric field $E_T$ in the transmissive display region 912, the liquid crystal molecules in the transmissive display region 912 will tilt along the x-axis direction first and those in the reflective display region 913 are pushed and pressed. Contrarily, the reoriented liquid molecules in the reflective display region 913 push and press the liquid molecules in the transmissive display region 912. As a result of the interaction, the liquid crystal molecules on the border of the reflective display region 913 and the transmissive display region 912 deviate out of the x-z plane. In other words, a twist deformation evolution occurs on the border of the reflective display-region 913 and the transmissive display region 912. This twist deformation evolution of the liquid crystal molecules occurs over a long time period; therefore, the rise period dynamic speed is slow. On the other hand, if the rubbing direction is along y-axis direction, which is parallel to the strip direction of the reflector pattern 907 as shown in FIG. 13B, then the rise period response speed of both reflective display mode and transmissive mode is relatively fast. FIG. 15B shows the section view of the equilibrium state director distribution with the strip electrode design of FIG. 13B when rubbing direction is along y-axis direction. In this case, since the rubbing direction is parallel to the strip direction of the reflector pattern 907, the liquid crystal molecules in both transmissive display region 912 and reflective display region 913 reorient in the y-z plane and no twist deformation occurs in the pixel area. Therefore, when the rubbing direction is along the strip direction of the reflector pattern 907, the dynamic rise time is faster. As a comparison, FIG. 15C shows the rise period dynamic response for different rubbing direction cases. As shown in FIG. 15C, when the rubbing direction is along y-axis, which is parallel to the strip direction of the reflector pattern 907, not only the response speed is faster, but the brightness is increased. Therefore, for the strip shape reflector pattern, the rubbing angle is preferably parallel to the strip direction of the reflector pattern.

In summary, the apparatus, method, system and device of the present invention provides a new transflective LCD design with uniform cell gap configuration throughout the transmissive and reflective display regions. Use of a mutually complementary common electrode pattern and reflector pattern or mutually complementary ITO pixel electrode pattern and reflector pattern, produces an electric field in the transmissive display region that is a uniform longitudinal field while the electric field in the reflective display region is a fringing field. Therefore, the initially vertically aligned negative dielectric anisotropic nematic liquid crystal material forms a smaller tilt angle with respect to the substrate normal in the reflective display region and simultaneously a larger tilt angle with respect to the substrate normal in the transmissive display region. Consequently, the ambient incident light experiences a reduced phase retardation in the reflective display region while the light from the backlight source experiences an increased phase retardation. Since the ambient light passes through the reflective display region twice while the light from the backlight source only passes through the transmissive display region once, by properly designing the electrodes and the reflector width, the light from both ambient light source and backlight source experience approximately the same phase retardation in both reflective and transmissive display regions. As a result, the electro-optical performance curves of both transmissive display mode and reflective display mode overlap.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A transflective liquid crystal display consisting essentially of:
    a first substrate having at least a first vertical alignment film and a transparent common electrode layer, wherein said transparent common electrode layer is laminated between said vertical alignment film and said first substrate on an interior side of the first substrate and a negative birefringence c-film, a first quarter-wave retardation film, a first half-wave retardation film, and a first polarizer successively laminated on an exterior side of the first substrate, wherein the negative birefringence c-film contacts with the first substrate and the first polarizer faces an observer;
    a second substrate having at least a second vertical alignment film, a non-conductive layer adjacent to the second vertical alignment film, a patterned transparent pixel electrode, and a patterned reflector sandwiched between the non-conductive layer and an interior side of the second substrate and second quarter-wave retardation film, a second half-wave retardation film, and a second polarizer successively laminated on an exterior side of the second substrate, wherein said patterned transparent pixel electrode, said patterned reflector, and said non-conductive layer are sandwiched between said second vertical alignment film and said second substrate, wherein said patterned reflector has a reflector pattern that is an approximately mutually complementary pattern to said patterned transparent pixel electrode to form alternating transmissive display regions and reflective display regions on said second substrate, wherein a substantially longitudinal electric field perpendicular to the first and second substrate is generated in said transmissive display regions and a substantially fringing field having both longitudinal and horizontal components is generated in said reflective display regions;

a liquid crystal material having a vertically aligned negative dielectric anisotropy sandwiched between said first vertical alignment film and said second vertical alignment film forming a liquid crystal layer having a single cell gap; and a backlight source provided outside of the second polarizer.

2. The transflective liquid crystal display of claim 1, wherein said patterned transparent electrode on said second substrate functions as a pixel electrode.

3. A method to produce a transflective liquid crystal display device consisting essentially of the steps of:

provising a first substrate having a first vertical alignment film thereon and a second substrate having a second vertical alignment film on an interior surface of the first and second substrate, respectively;

successively laminating a negative birefringence c-film, a first quarter-wave retardation film, a first half-wave retardation film, and a first polarizer on an exterior surface of the first substrate;

successively laminating a second quarter-wave retardation film, a second half-wave retardation film, and a second polarizer on an exterior side of the second substrate;

providing a liquid crystal material with negative dielectric anisotropy between said first vertical alignment film and said second vertical alignment film;

providing a patterned transparent electrode said second substrate;

providing a non-patterned transparent electrode said first substrate;

providing a patterned reflector on said second substrate, wherein said patterned transparent electrode pattern and said patterned reflector pattern are approximately mutually complementary to each other to form alternating transmissive and reflective display regions so that a substantially longitudinal electric field is generated in said transmissive display regions and a substantially fringing field is generated in said reflective display regions; and providing a non-conductive layer between the alternative patterned reflector and patterned transparent electrode and the second alignment film.

4. The method of claim 3, wherein said patterned transparent electrode is on said first substrate, further comprising:

connecting said patterned reflector on said second substrate to said non-patterned transparent electrode on said second substrate so that at least said non-patterned transparent electrode functions as a pixel electrode.

5. The method of claim 3, wherein said patterned transparent electrode is on said second substrate and only said patterned transparent electrode functions as a pixel electrode.

\* \* \* \* \*